(12) United States Patent
Shimura et al.

(10) Patent No.: US 12,395,963 B2
(45) Date of Patent: Aug. 19, 2025

(54) COMMUNICATION APPARATUS, INFORMATION PROCESSING APPARATUS, AND POSITION INFORMATION MANAGEMENT METHOD

(71) Applicant: CANON KABUSHIKI KAISHA, Tokyo (JP)

(72) Inventors: Yasuhiro Shimura, Kanagawa (JP); Yuki Nakajima, Kanagawa (JP); Yu Tanaka, Tokyo (JP); Mitsuhide Murofushi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 17/929,653

(22) Filed: Sep. 2, 2022

(65) Prior Publication Data

US 2022/0417895 A1 Dec. 29, 2022

Related U.S. Application Data

(63) Continuation of application No. PCT/JP2021/008032, filed on Mar. 3, 2021.

(30) Foreign Application Priority Data

Mar. 4, 2020 (JP) ................. 2020-037063

(51) Int. Cl.
*H04W 64/00* (2009.01)
*G06K 7/10* (2006.01)
*G06K 19/07* (2006.01)

(52) U.S. Cl.
CPC ...... *H04W 64/003* (2013.01); *G06K 7/10297* (2013.01); *G06K 19/0723* (2013.01)

(58) Field of Classification Search
None
See application file for complete search history.

(56) References Cited

U.S. PATENT DOCUMENTS

| 2010/0201520 A1* | 8/2010 | Stern ................. G01S 13/878 340/572.1 |
| 2012/0092134 A1* | 4/2012 | Stern ................. G01S 13/878 340/10.1 |
| 2016/0033634 A1* | 2/2016 | Nikitin ................ G01S 13/74 342/450 |
| 2016/0363661 A1* | 12/2016 | Nikitin ............... G01S 5/02585 |

(Continued)

FOREIGN PATENT DOCUMENTS

| CN | 103984971 A | 8/2014 |
| CN | 106707226 A | 5/2017 |

(Continued)

*Primary Examiner* — Adolf Dsouza
(74) *Attorney, Agent, or Firm* — Canon U.S.A., Inc. IP Division

(57) ABSTRACT

A communication apparatus detects a wireless device and calculates a relative position of the detected wireless device with respect to a reference wireless device to be a reference in identifying a position based on a movement amount of the communication apparatus from when the reference wireless device is detected by the communication apparatus. The communication apparatus associates the calculated relative position, identification information about the detected wireless device, and identification information about the reference wireless device.

16 Claims, 19 Drawing Sheets

(56) References Cited

U.S. PATENT DOCUMENTS

2016/0370454 A1 12/2016 Raynesford
2017/0092090 A1 3/2017 Lerner
2018/0293535 A1 10/2018 Christopher

FOREIGN PATENT DOCUMENTS

| JP | 2005320074 A | | 11/2005 |
|----|--------------|---|---------|
| JP | 2006184253 A | | 7/2006 |
| JP | 2007114003 A | | 5/2007 |
| JP | 2010066149 A | * | 3/2010 |
| JP | 2010215305 A | | 9/2010 |
| JP | 2016212794 A | | 12/2016 |
| JP | 2019182560 A | | 10/2019 |

* cited by examiner

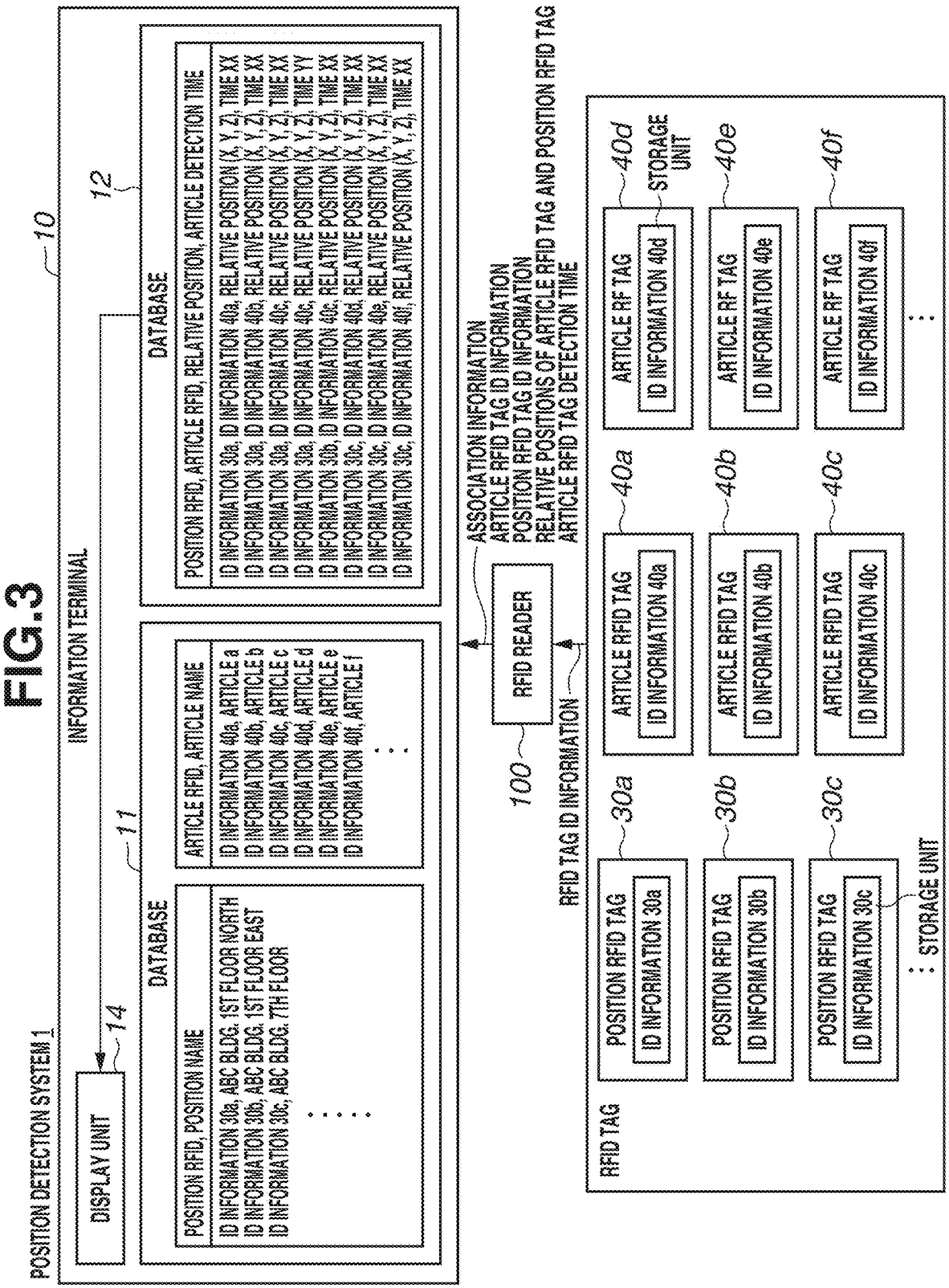

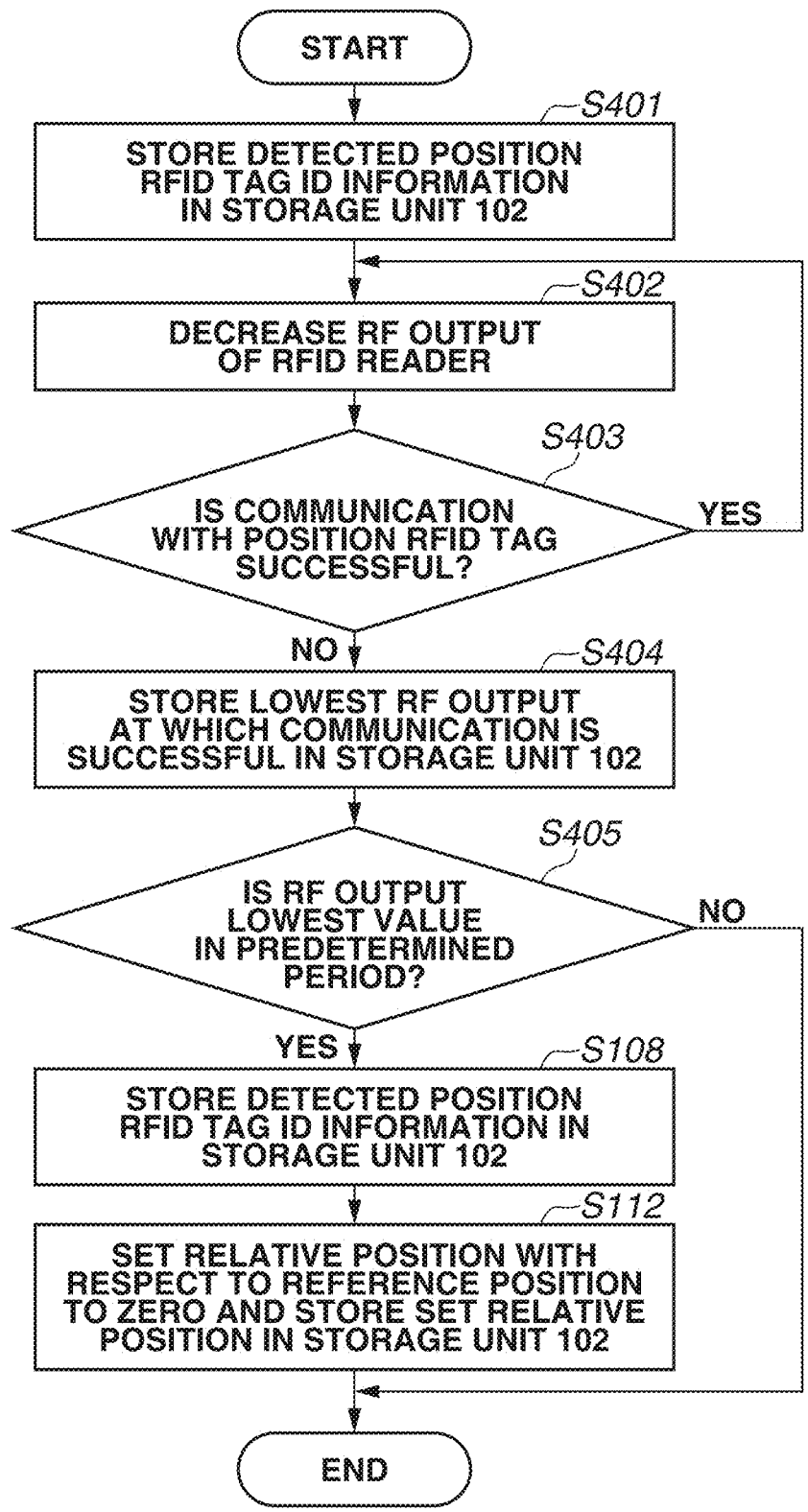

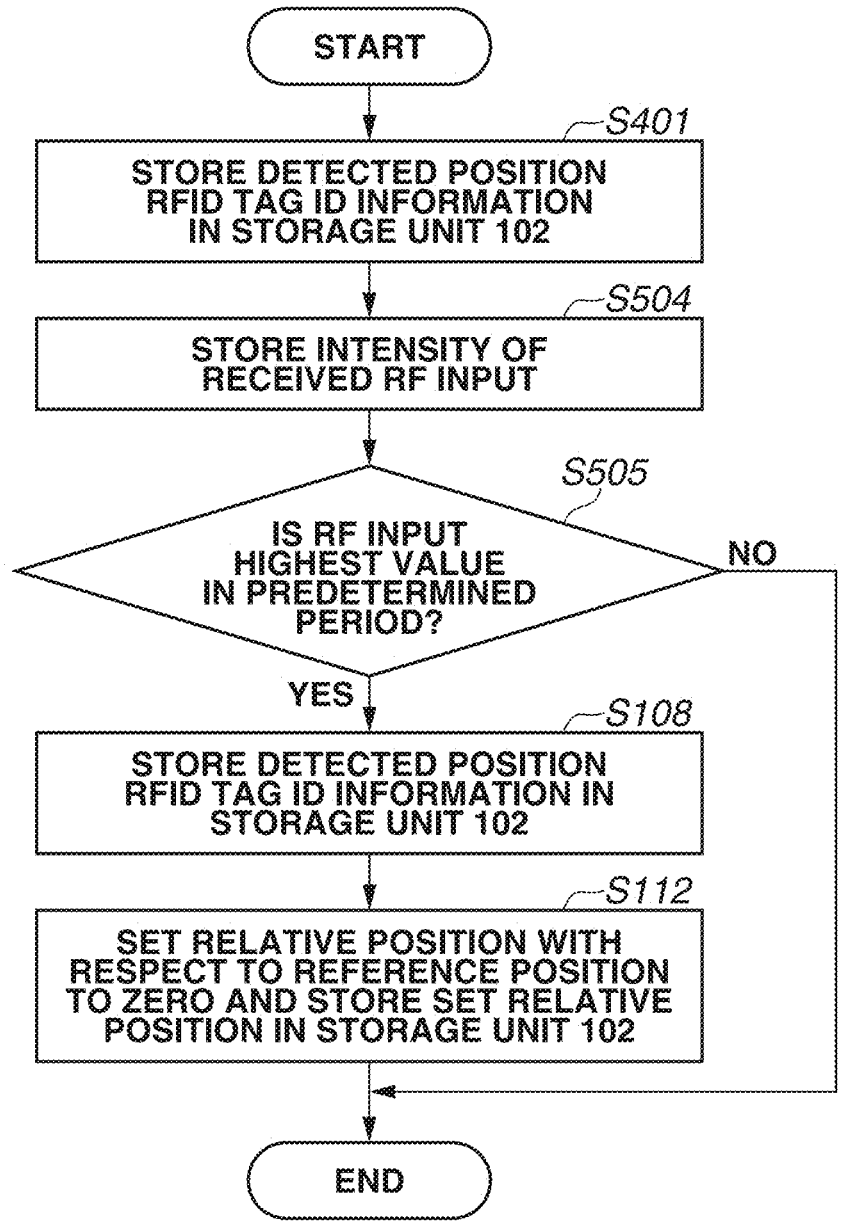

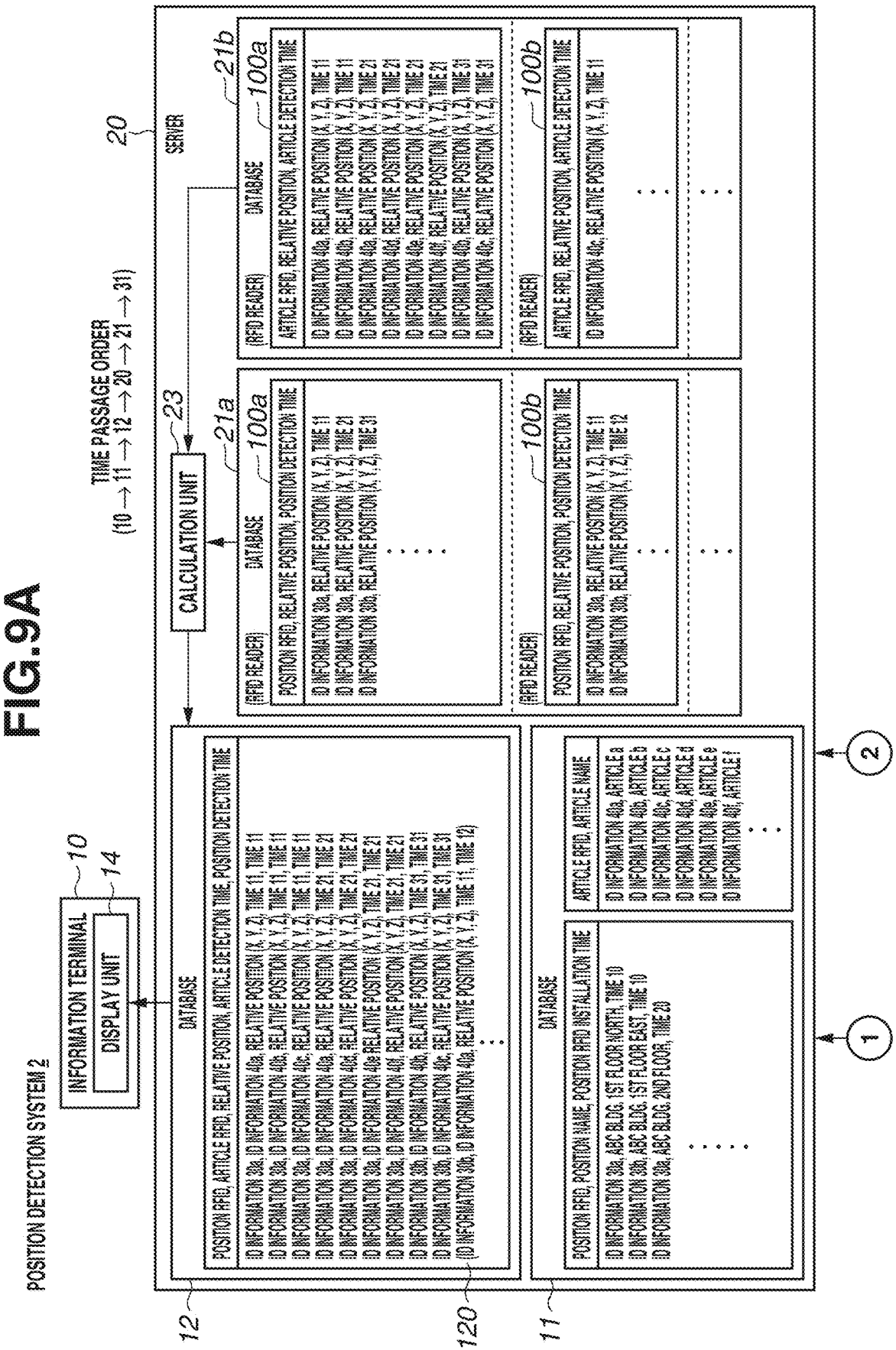

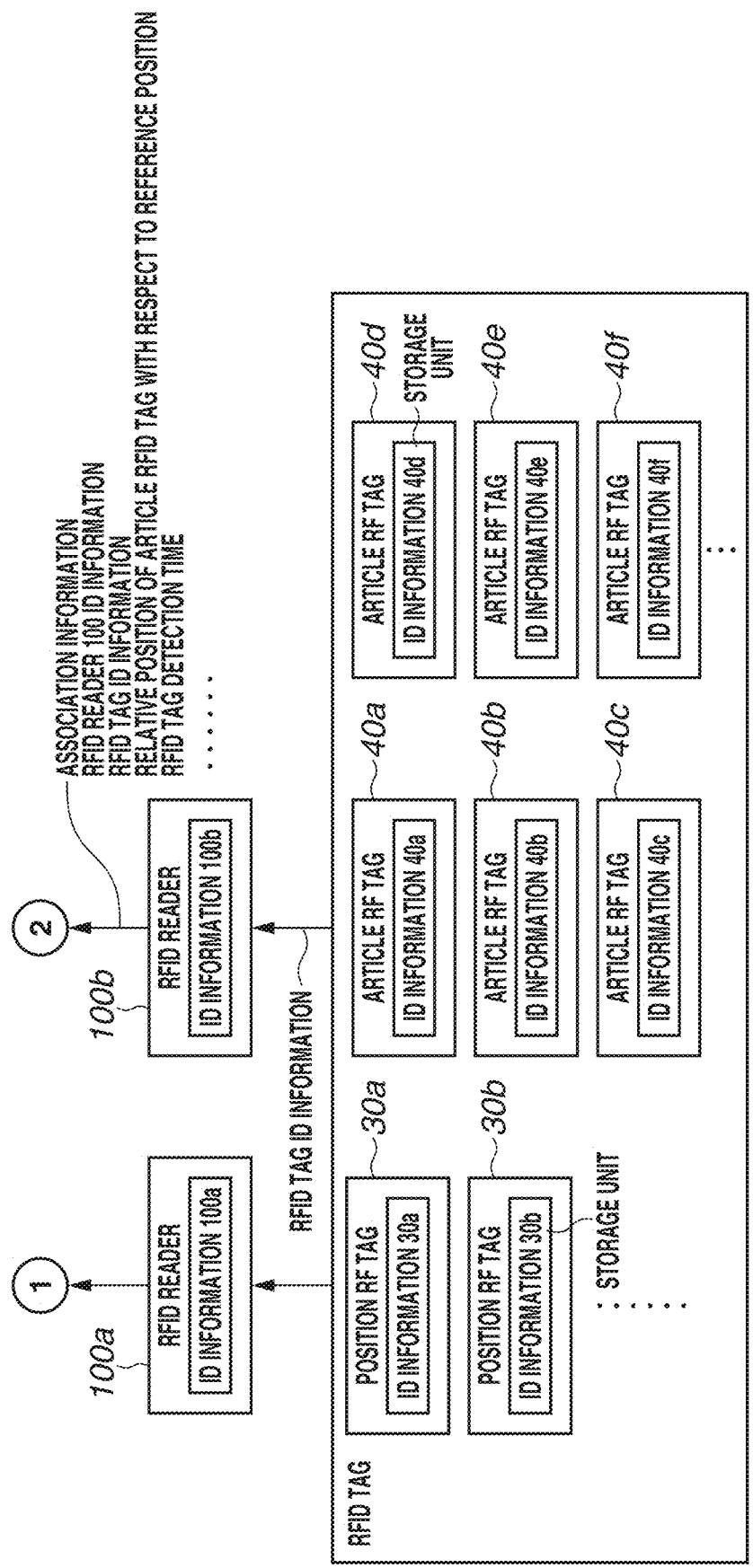

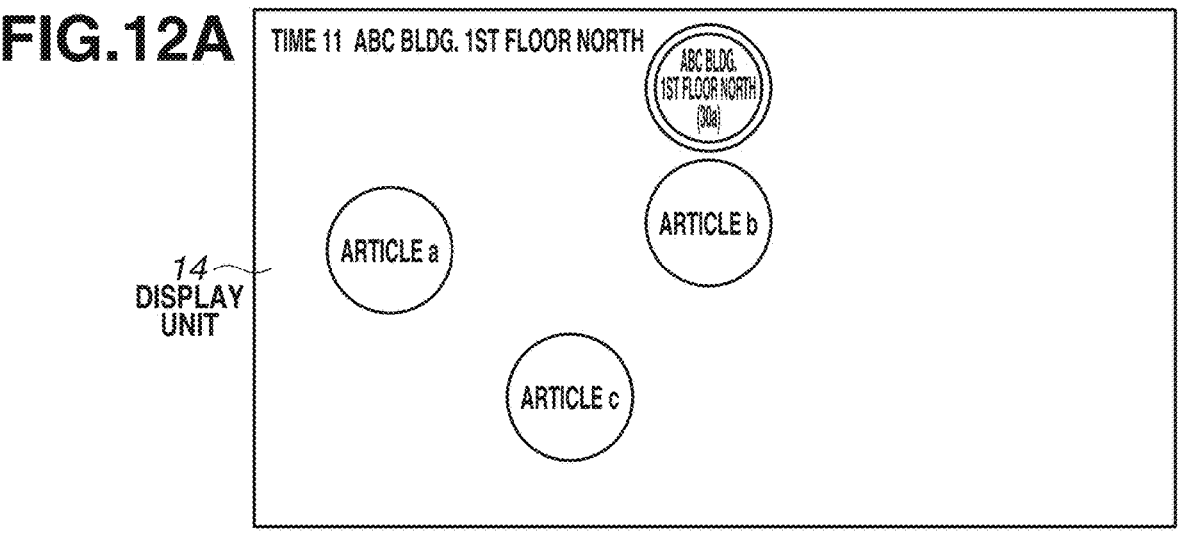
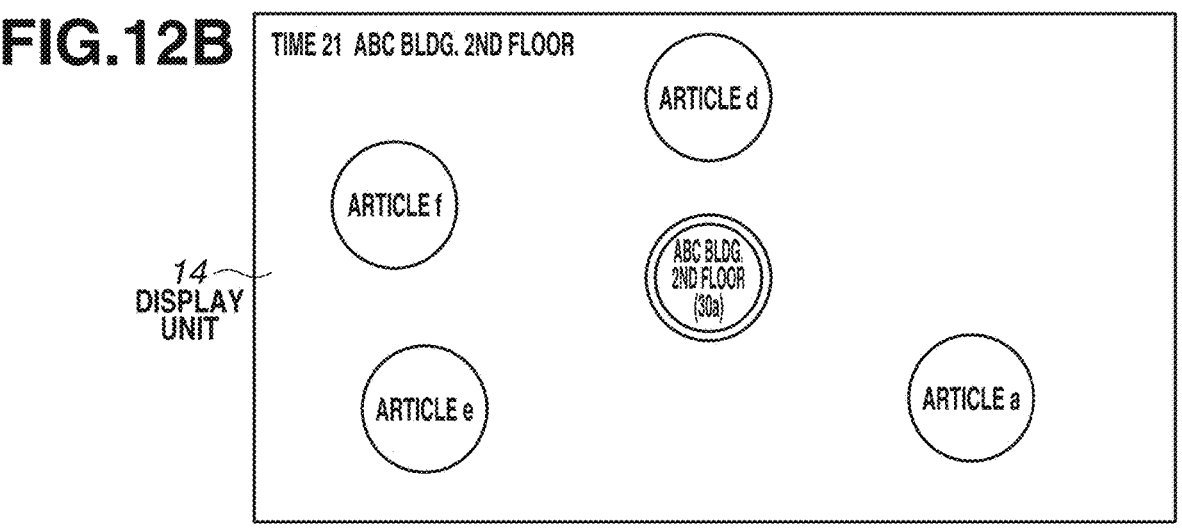
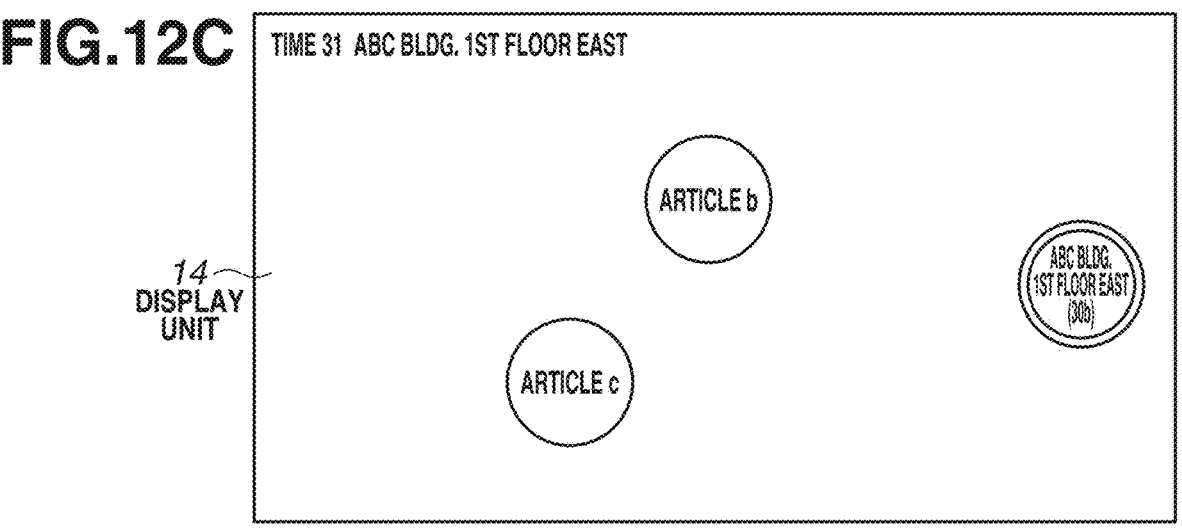

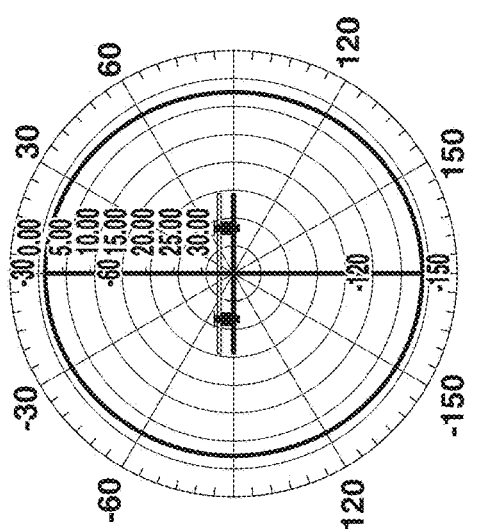
FIG. 17A
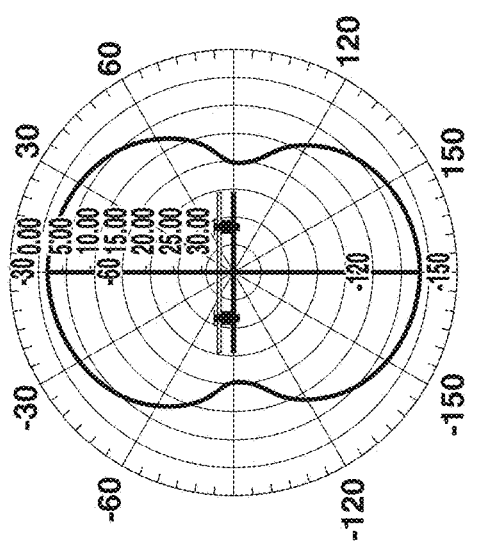
FIG. 17B
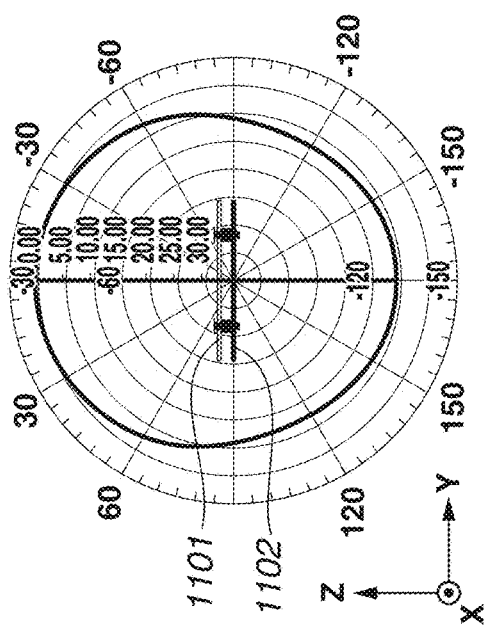
FIG. 17C
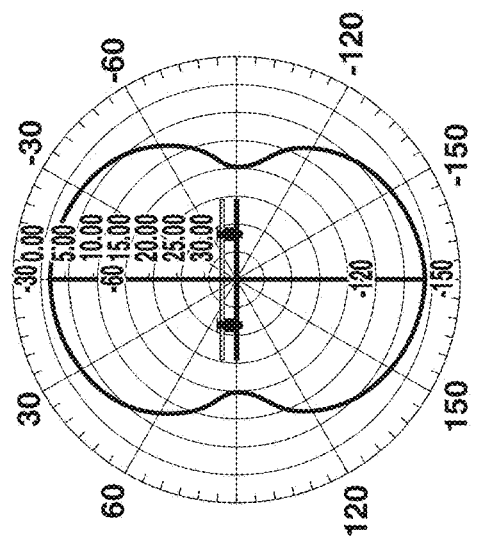
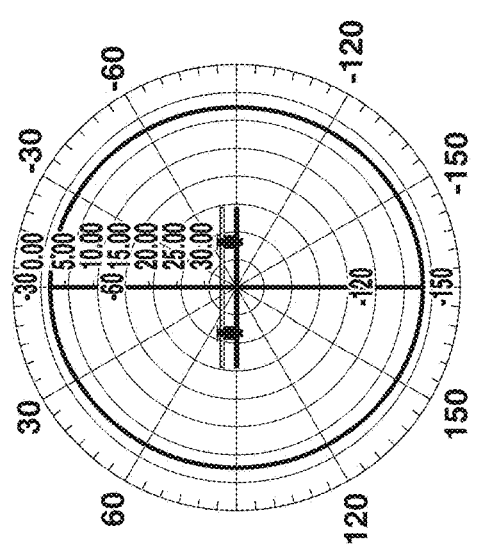
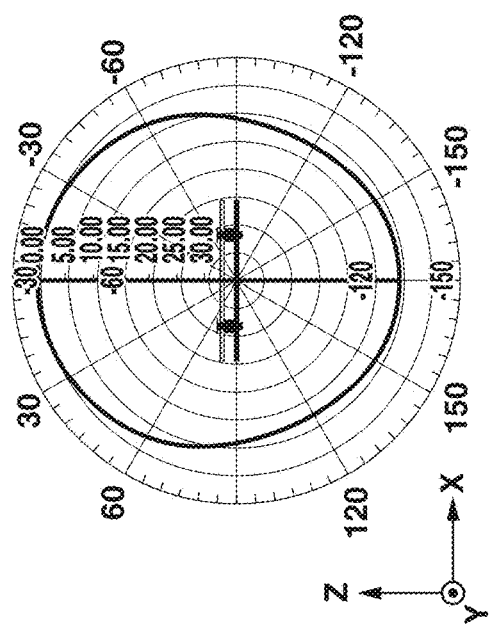

COMMUNICATION APPARATUS, INFORMATION PROCESSING APPARATUS, AND POSITION INFORMATION MANAGEMENT METHOD

CROSS-REFERENCE TO RELATED APPLICATIONS

This application is a Continuation of International Patent Application No. PCT/JP2021/008032, filed Mar. 3, 2021, which claims the benefit of Japanese Patent Application No. 2020-037063, filed Mar. 4, 2020, both of which are hereby incorporated by reference herein in their entirety.

BACKGROUND OF THE INVENTION

Field of the Invention

The present invention relates to a technique for managing position information about a wireless device.

Background Art

In logistics, inventory taking, or animal management, a system of managing management target articles or animals using ultra-high frequency (UHF) passive radio frequency identification tags (hereinafter, referred to as RFID tags) as wireless devices are used. The RFID tags receive electric waves (electromagnetic waves) emitted from an antenna of an RFID reader and operate using power generated by the received electric waves (electromagnetic waves). This produces advantages that no batteries are needed and the RFID tags can be manufactured to be thin and at a low cost. However, since an RFID tag and the RFID reader can communicate only within short distances, there is a disadvantage that the RFID tags existing over a large area cannot be detected at one time.

Thus, a method for managing position information about management targets that exist over a wide area and to which RFID tags are attached has been discussed. Specifically, an RFID reader configured to detect the position information is carried, and the position information at the time of detection of an RFID tag is automatically associated with identification (ID) information about the RFID tag. Japanese Patent Application Laid-Open No. 2007-114003 discusses a technique for detecting position information about an RFID reader using the Global Positioning System (GPS).

CITATION LIST

Patent Literature

PTL 1: Japanese Patent Application Laid-Open No. 2007-114003

SUMMARY OF THE INVENTION

However, the method of detecting position information about the RFID reader using GPS is not suitable for indoor use. Furthermore, a GPS reception circuit needs to be provided, and thus there is an issue of an increased cost of the RFID reader.

Thus, the present invention is directed to a technique of managing position information about management target wireless devices existing over a large area with ease while preventing an increase in cost.

According to an aspect of the present invention, a communication apparatus includes a detection unit configured to detect a wireless device, a calculation unit configured to calculate a relative position of the detected wireless device with respect to a first wireless device to be a reference in identifying a position based on a movement amount of the communication apparatus from when the first wireless device is detected by the communication apparatus, and an association unit configured to associate the relative position calculated by the calculation unit, identification information about the detected wireless device, and identification information about the first wireless device.

According to another aspect of the present invention, an information processing apparatus includes a reception unit configured to receive, from a communication apparatus that detects a wireless device, identification information about the detected wireless device and information about a relative position of the detected wireless device with respect to a reference position, a calculation unit configured to calculate a relative position of the wireless device with respect to a first wireless device to be a reference in identifying a position based on the information received by the reception unit using information about a relative position of the first wireless device with respect to the reference position and the information about the relative position of the detected wireless device different from the first wireless device with respect to the reference position, and an association unit configured to associate the relative position calculated by the calculation unit, the identification information about the detected wireless device, and identification information about the first wireless device.

Further features of the present invention will become apparent from the following description of exemplary embodiments with reference to the attached drawings.

BRIEF DESCRIPTION OF THE DRAWINGS

FIG. 3 is a system diagram according to a first exemplary embodiment.

FIG. 6 is a flowchart illustrating a process of control to increase the accuracy of position information.

FIG. 7 is a flowchart illustrating a process of control to increase the accuracy of position information.

FIG. 9, which includes FIGS. 9A and 9B, is a system diagram according to a second exemplary embodiment.

FIG. 12A is a diagram illustrating a display method of a display unit 14 according to the second exemplary embodiment.

FIG. 12B is a diagram illustrating the display method of the display unit 14 according to the second exemplary embodiment.

FIG. 12C is a diagram illustrating the display method of the display unit 14 according to the second exemplary embodiment.

FIG. 17A is a diagram illustrating radiation characteristics of the antenna 115.

FIG. 17B is a diagram illustrating radiation characteristics of the antenna 115.

FIG. 17C is a diagram illustrating radiation characteristics of the antenna 115.

DESCRIPTION OF THE EMBODIMENTS

A method of managing position information about a management target wireless device according to various exemplary embodiments of the present invention will be described in detail below with reference to the drawings. In the management method according to an exemplary embodiment of the present invention, a communication apparatus configured to detect wireless devices is carried by a moving body such as a person or a machine to detect the wireless devices existing over a large area. The wireless devices are, for example, radio frequency identification (RFID) tags, and the communication apparatus is, for example, an RFID reader.

Figure 2A:
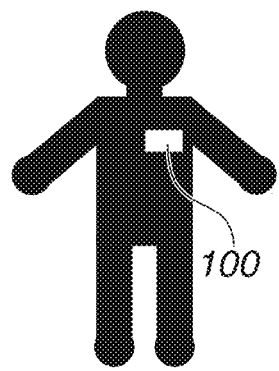
FIG. 2A is a diagram illustrating a moving body that carries the RFID reader 100.
Figure 2B:
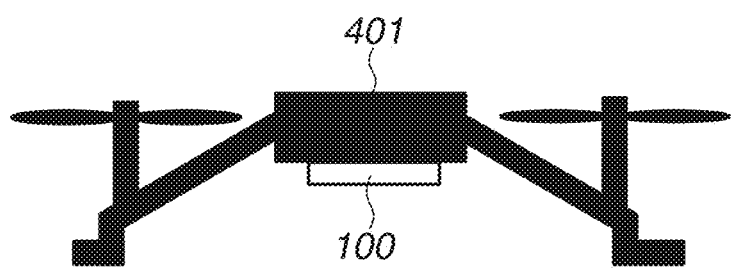
FIG. 2B is a diagram illustrating the moving body that carries the RFID reader 100.
Figure 2C:
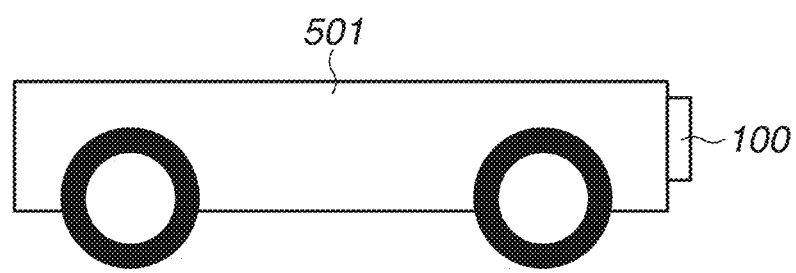
FIG. 2C is a diagram illustrating the moving body that carries the RFID reader 100.

As illustrated in FIGS. 2A, 2B, and 2C, there are methods in which, for example, a person (animal) wears an RFID reader 100 (FIG. 2A) or the RFID reader 100 is attached to a machine such as a drone 401 or an automated guided vehicle 501 (FIGS. 2B and 2C). With the methods, the RFID reader 100 can be moved extensively and can detect RFID tags existing over a large area.

The RFID reader 100 has a function of feeding ultrahigh-frequency (UHF) electromagnetic waves to an RFID tag to cause an integrated circuit (IC) chip in the RFID tag to operate and to read identification (ID) information stored in a storage unit of the RFID tag. Further, the RFID reader 100 and the RFID tag can wirelessly communicate with each other over a distance of several meters.

Figure 15A:
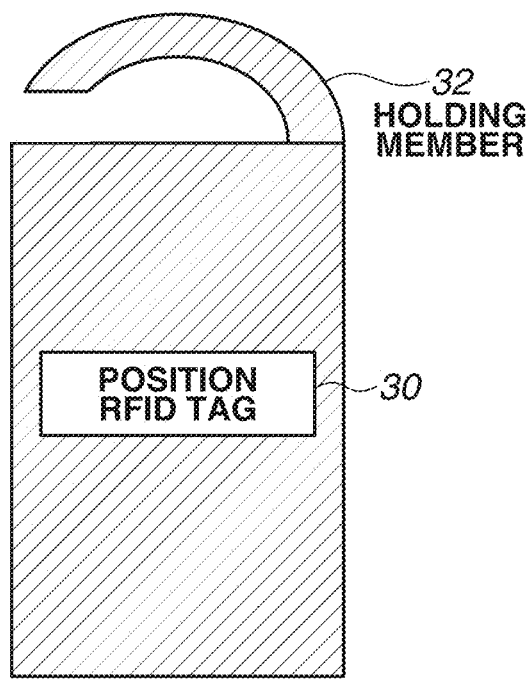
FIG. 15A is a diagram illustrating a position RFID tag 30 and an article RFID tag 40.
Figure 15B:
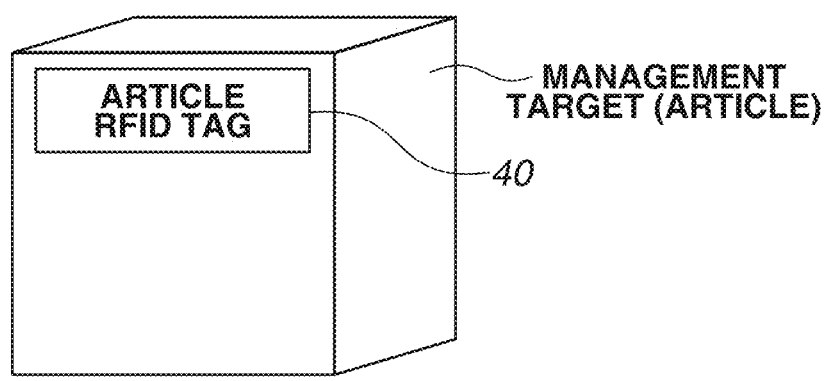
FIG. 15B is a diagram illustrating the position RFID tag 30 and the article RFID tag 40.

In the present exemplary embodiment, as illustrated in FIG. 15B, an RFID tag attached to a management target such as an article or an animal will be referred to as an article RFID tag 40. The article RFID tag 40 is used to identify the management target to which the article RFID tag 40 is attached based on ID information stored in the article RFID tag 40. Further, as illustrated in FIG. 15A, an RFID tag for use as a reference in identifying a position of the article RFID tag 40 will be referred to as a position RFID tag 30. The RFID reader 100 calculates a relative position of the article RFID tag 40 with respect to the position RFID tag 30 being a reference using a movement amount detection sensor 104 described below.

Information about the relative position of the article RFID tag 40 with respect to the position RFID tag 30 is displayed on a display unit 14 in FIG. 3 so that a user can locate the management target to which the article RFID tag is attached. Details of each process will be described below in the following exemplary embodiments.

While examples in which the RFID tags are used as detection target wireless devices and the RFID reader is used as a communication apparatus that detects the wireless devices are described in the exemplary embodiments of the present invention, the wireless devices and the communication apparatus are not limited to those in the examples. For example, other wireless communications such as short-range wireless communication, e.g., near field communication (NFC) or Bluetooth®, can be used instead of RFID. Alternatively, RFID using another frequency band can be used instead of UHF RFID.

First Exemplary Embodiment

Figure 1:
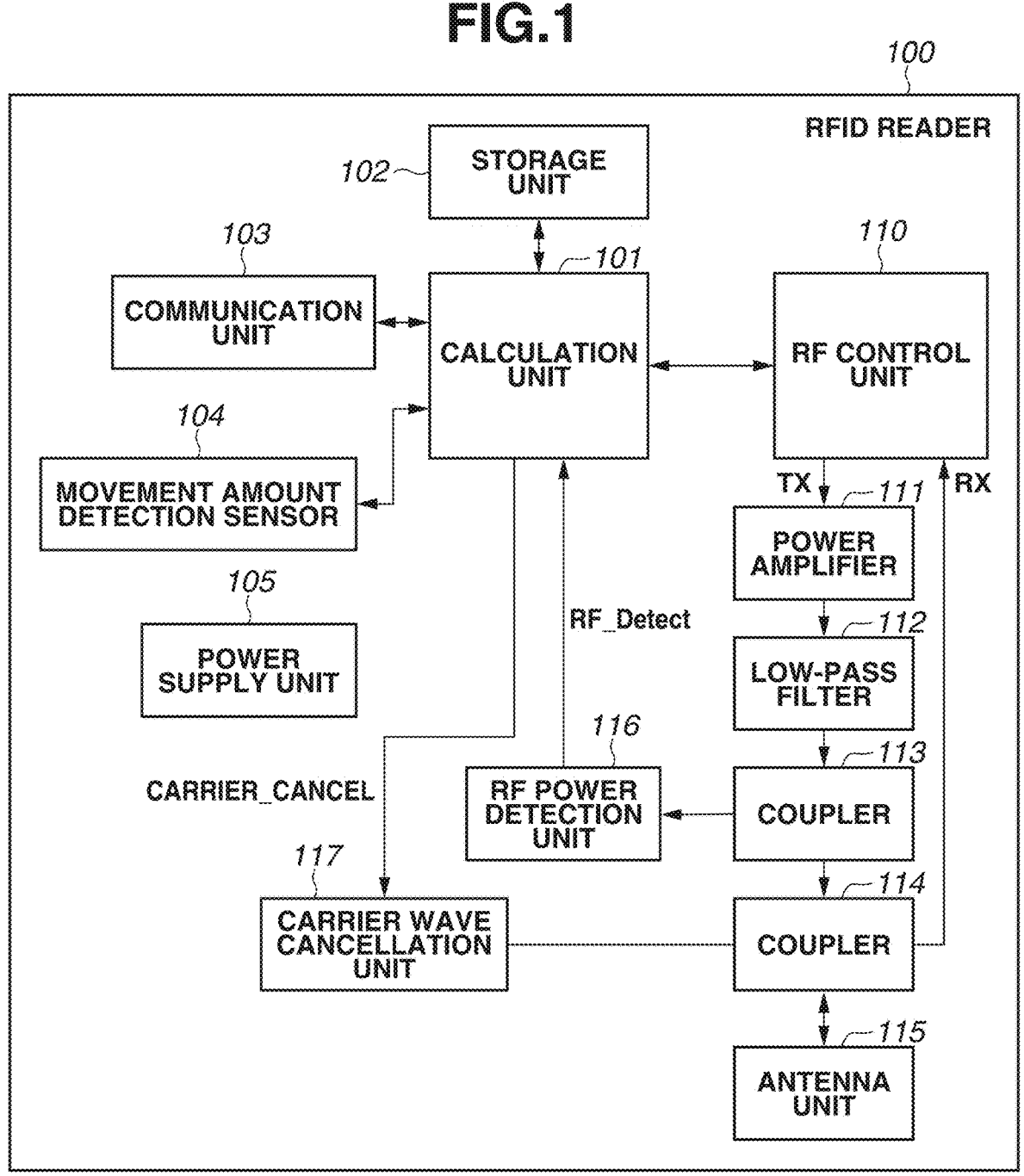
FIG. 1 is a diagram illustrating a radio frequency identification (RFID) reader 100.

FIG. 1 is a circuit block diagram illustrating the RFID reader 100 for use in a first exemplary embodiment. The RFID reader 100 is controlled by a calculation unit 101 including one or more processors such as a central processing unit (CPU). A radio frequency (RF) control unit 110 outputs UHF RF output from a transmission (TX) terminal based on the control by the calculation unit 101. The RF output is amplified by a power amplifier 111, and then a low-pass filter 112 cuts unnecessary frequency bands. The power of the RF output is variably set by the calculation unit 101. A coupler 113 is used in detecting power by a RF power detection unit 116.

A power detection result of the RF power detection unit 116 can be detected as an RF_Detect signal by the calculation unit 101. A coupler 114 is used to separate RF output to an antenna unit 115 and RF input received from the antenna unit 115. The antenna unit 115 is used to supply power to the RFID tags and to communicate with the RFID tags. A carrier wave cancellation unit 117 cancels a carrier wave component of the RF input based on a CARRIER_CANCEL signal, and a signal component of the RF input is received by a reception (RX) terminal of the RF control unit 110, and ID information that is identification information about the RFID tag is detected.

The calculation unit 101 stores the ID information about the RFID tag that is detected by the RF control unit 110 in a storage unit 102, performs necessary data processing, and then communicates with an information terminal 10, which will be described below with reference to FIG. 3, via a communication unit 103. The storage unit 102 includes one or more memories such as a read-only memory (ROM) and a random access memory (RAM) and stores various types of data and programs to be processed by the calculation unit 101. The communication unit 103 can communicate with the information terminal 10 via wired communication using Ethernet® or Universal Serial Bus (USB) or via wireless communication using a wireless local area network (wireless LAN) or a public wireless system.

The movement amount detection sensor 104 is a sensor that includes a three-axis acceleration sensor, a gyro sensor, and a geomagnetic sensor and detects a movement amount of the RFID reader 100. The movement amount detection sensor 104 is used to calculate relative positions of the position RFID tag 30 to be a reference and the article RFID tag 40. The movement amount detection sensor 104 can use any detection method by which a movement distance and a movement direction of the RFID reader are detectable. In exemplary embodiments of the present invention, information about a combination of a movement distance and a movement direction (two- or three-dimensional direction) is used as a movement amount.

While the RFID reader 100 automatically detects ID information about the RFID tags, the movement amount detection sensor 104 calculates relative positions of the RFID tags and associates the ID information about the plurality of RFID tags with information about the relative positions of the plurality of RFID tags. A power supply unit 105 is a circuit that includes a battery and a direct-current (DC)-DC converter and is used to supply a power source voltage to the RFID reader 100.

FIG. 3 is a system diagram according to the present exemplary embodiment. The RFID tags are classified into the position RFID tag 30 (30a to 30c) for use in detecting a reference position and the article RFID tag 40 (40a to 40f) attached to a management target. Details of the RFID tags will be described below with reference to FIGS. 15A and 15B.

The RFID reader 100 associates ID information about the article RFID tag 40, ID information about the position RFID tag 30, information about the relative position of the article RFID tag 40 with respect to the position RFID tag 30, and detection time of the article RFID tag 40. Then, the pieces of information are transmitted to the information terminal 10.

The information terminal 10 is an information terminal such as a smartphone or a personal computer (PC) and includes databases 11 and 12 and the display unit 14. The database 11 stores data in which the ID information about the position RFID tag 30 and a position name are associated with each other and data in which the ID information about the article RFID tag 40 and an article name are associated with each other.

It is difficult for a user to recognize the ID information about the RFID tags directly, so that the ID information is converted into a name based on the database 11 and the converted name is displayed on the display unit 14. Alternatively, the ID information about the RFID tags can be displayed directly on the display unit without using the database 11.

The database 12 stores information received from the RFID reader 100. Specifically, the database 12 stores data in which the ID information about the position RFID tag 30, the ID information about the article RFID tag 40, the relative position of the article RFID tag 40 with respect to the position RFID tag 30, and the detection time of the article RFID tag 40 are associated with one another. The display unit 14 displays article position information based on a user instruction via an interface (not illustrated) of the information terminal 10. A specific display method of the display unit 14 will be described below with reference to FIGS. 5A, 5B, and 5C.

Figure 4:
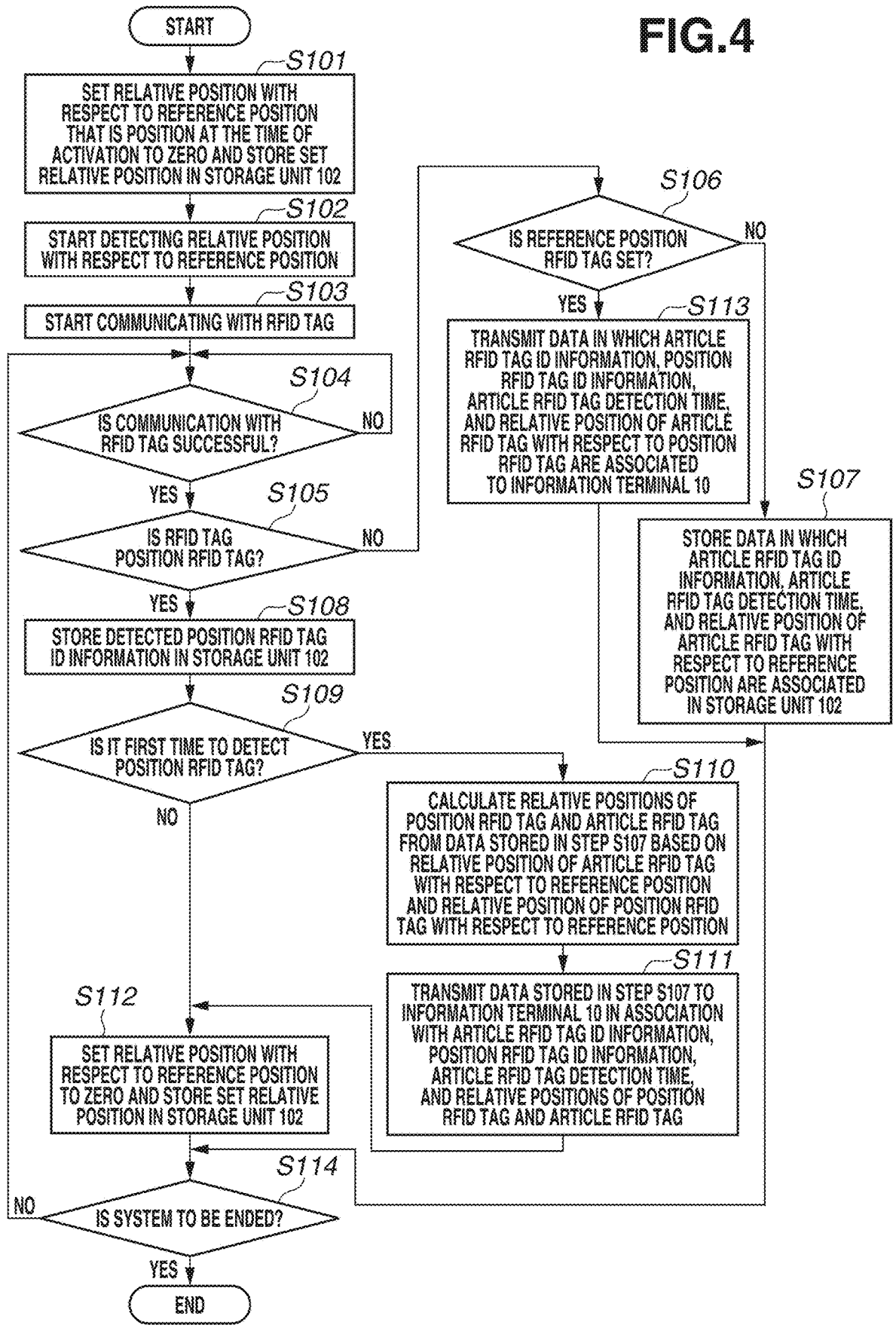
FIG. 4 is a flowchart illustrating a process of control by the RFID reader 100 according to the first exemplary embodiment.

FIG. 4 is a flowchart illustrating a method of detecting position information about the article RFID tag by the RFID reader 100 according to the present exemplary embodiment. If a power source is changed to an ON state, the RFID reader 100 starts controlling the detection of article position information. The calculation unit 101 of the RFID reader 100 executes a program stored in the storage unit 102 to thereby implement each step of the flowchart in FIG. 4.

In step S101, the RFID reader 100 sets the information about the relative position with respect to the reference position in the storage unit 102 to zero (x=0, y=0, z=0). The reference position is the position of the RFID reader 100 at the time of activation.

In step S102, the RFID reader 100 starts controlling calculation of an integral value of movement amounts based on detection results of the movement amount detection sensor 104, updating of the information about the relative position with respect to the reference position, and storing of the information in the storage unit 102. In step S103, the RFID reader 100 periodically causes the RF control unit 110 to operate to communicate with an RFID tag and starts controlling communication with the RFID tag.

In step S104, the RFID reader 100 determines whether ID information about the RFID tag is acquired from the RFID tag. In a case where the ID information about the RFID tag is acquired, the processing proceeds to step S105. On the other hand, in a case where the ID information about the RFID tag is not acquired, the processing of step S104 is repeated.

In step S105, the RFID reader 100 determines whether the RFID tag is the position RFID tag 30 or the article RFID tag 40 based on the acquired ID information. As a method of discriminating the position RFID tag 30 from the article RFID tag 40, for example, the ID information about the RFID tag can include an identifier for discriminating the position RFID tag 30 from the article RFID tag 40. Further, the database 11 of the information terminal 10 can be referred to in the determination. In a case where the RFID tag is the article RFID tag, the processing proceeds to step S106. On the other hand, in a case where the RFID tag is the position RFID tag, the processing proceeds to step S108.

In step S106, the RFID reader 100 determines whether a reference position RFID tag is set. In a case where the reference position RFID tag is not set yet, e.g., in a case where it is immediately after activation of the RFID reader 100, the processing proceeds to step S107. On the other hand, in a case where the reference position RFID tag is set, the processing proceeds to step S113.

In step S107, the RFID reader 100 stores data in which the ID information about the article RFID tag 40, the detection time of the article RFID tag 40, and the relative position of the article RFID tag 40 with respect to the reference position (initial position at the time of activation) are associated with one another in the storage unit 102.

In step S108, the RFID reader 100 stores the ID information about the detected position RFID tag 30 as a reference position RFID tag in the storage unit 102, and the processing proceeds to step S109. In step S109, the RFID reader 100 determines whether it is the first time to detect a position RFID tag after the activation of the RFID reader 100. In a case where it is the first time to detect the position RFID tag, the processing proceeds to step S110. On the other hand, in a case where it is the second time or subsequent time, the processing proceeds to step S112.

In step S110, the RFID reader 100 performs the following processing on the data stored in the storage unit 102 in step S107. Specifically, relative positions of the position RFID tag 30 and the article RFID tag 40 are calculated based on the information about the relative position of the article RFID tag 40 with respect to the reference position and the information about the relative position of the position RFID tag 30 that is stored in the storage unit 102 in step S108 with respect to the reference position. As used herein, the term reference position refers to the initial position at the time of activation of the RFID reader 100 (the position stored in step S101).

In step S111, the RFID reader 100 performs the following processing on the data stored in the storage unit 102 in step S107. Specifically, the RFID reader 100 associates the ID information about the article RFID tag 40, the ID information about the position RFID tag 30, the detection time of the article RFID tag 40, and the information about the relative position of the article RFID tag 40 with respect to the position RFID tag 30. Then, the RFID reader 100 transmits the information to the information terminal 10. The communication unit 103 is used in the transmission.

In step S112, the RFID reader 100 sets the information about the relative position with respect to the reference position in the storage unit 102 to zero (x=0, y=0, z=0), and the processing returns to step S102. In step S113, the RFID reader 100 associates the ID information about the detected article RFID tag 40, the ID information about the position RFID tag 30, the detection time of the article RFID tag 40, and the information about the relative position of the article RFID tag 40 with respect to the position RFID tag 30. Then, the RFID reader 100 transmits the information to the information terminal 10.

The RFID reader 100 repeats the foregoing control until a system end request is received (S114). With the process, the calculation unit 101 of the RFID reader 100 controls automatic detection of position information about the article RFID tag 40 attached to a management target and transmission of the detected position information to the information terminal 10.

Figure 5A:
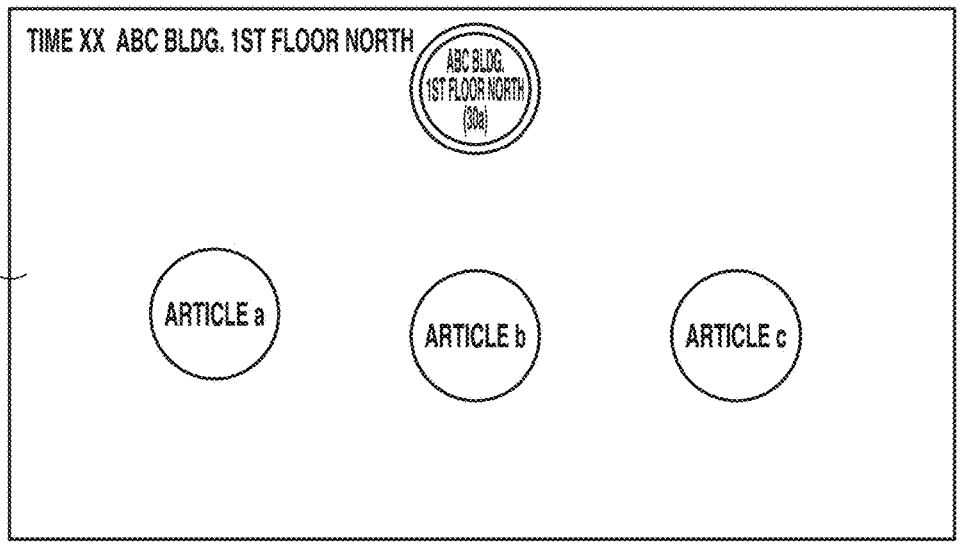
FIG. 5A is a diagram illustrating a display method of a display unit 14 according to the first exemplary embodiment.
Figure 5B:
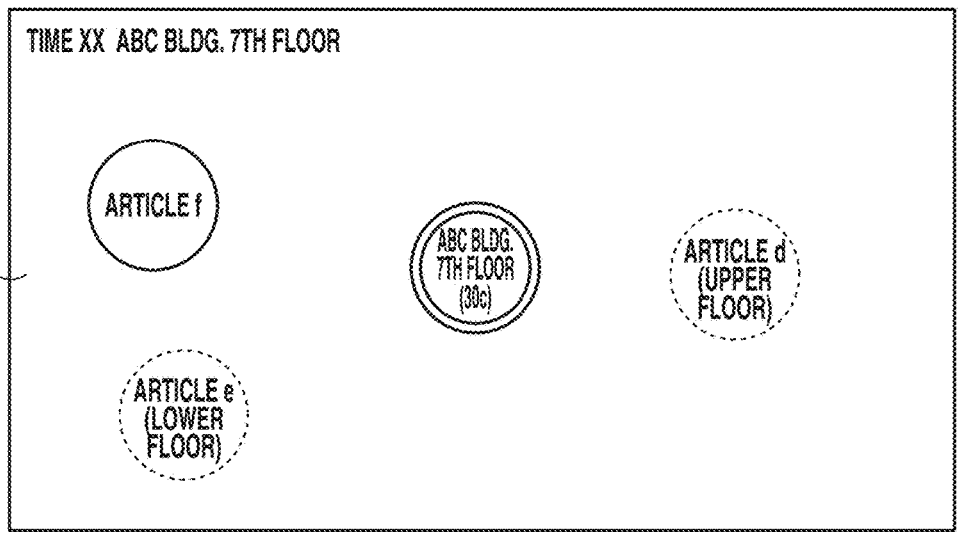
FIG. 5B is a diagram illustrating the display method of the display unit 14 according to the first exemplary embodiment.
Figure 5C:
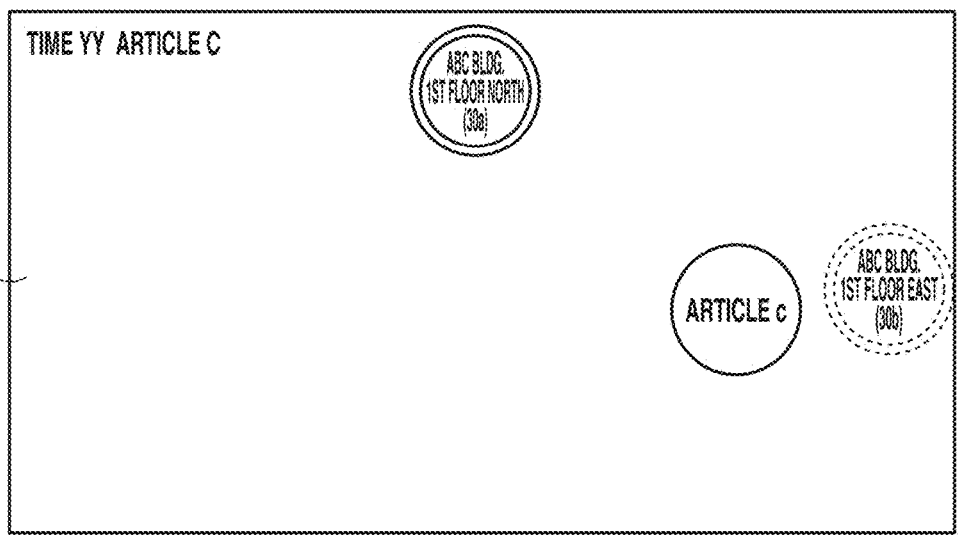
FIG. 5C is a diagram illustrating the display method of the display unit 14 according to the first exemplary embodiment.

FIGS. 5A, 5B, and 5C illustrates an example of a display that is displayed on the display unit 14 of the information terminal 10. In the display examples in FIGS. 5A, 5B, and 5C, position information about management target articles is displayed based on the information in the databases 11 and 12. In the display examples in FIGS. 5A, 5B, and 5C, the display unit 14 displays the position RFID tag 30 as a double circle and the article RFID tag 40 as a single circle.

FIG. 5A illustrates an example of a display on the display unit 14 in a case where a user instructs the information terminal 10 to display information about ABC building $1^{st}$ floor north at time XX. In the database 12, first, with respect to ID information 40a to 40c (articles a to c) about the article RFID tag 40 associated with ID information 30a (ABC building $1^{st}$ floor north), data having the closest article detection time to the time XX is selected for each ID. Then, the information about the relative positions of the articles with respect to the position RFID tag is referred to so that the display unit 14 displays position information about the articles a to c based on the position of ABC building $1^{st}$ floor north as a reference. A user can locate the articles in actuality using the display information displayed on the display unit 14 and the disposed position RFID tag as a mark.

FIG. 5B illustrates an example of a display on the display unit 14 in a case where a user issues an instruction to display ABC building 7th floor at the time XX. In FIG. 5B, a display example in a case where articles d and e are each on a floor different from the $7^{th}$ floor of ABC building is illustrated. In a case where a distance between the relative positions of the articles d and e and a position RFID tag 30c on the $7^{th}$ floor of ABC building in a height direction is greater than a predetermined setting value, the articles d and e are detected as being on a floor different from the 7th floor of ABC building. The display unit 14 displays each article that is on a different floor as a dotted circle to indicate to a user that the articles d and e are not on the same floor as the position RFID tag 30c. The display unit 14 displays a display indicating that the article d is on an upper floor of the $7^{th}$ floor of ABC building and the article e is on a lower floor of the $7^{th}$ floor of ABC building based on the information about the relative position with respect to the position RFID tag 30c.

FIG. 5C illustrates an example of a display on the display unit 14 in a case where a user issues an instruction to display the article c at time YY. With respect to the position RFID tag 30a (ABC building $1^{st}$ floor north) associated with the ID information 40c (article c) in the database 12 and a position RFID tag 30b (ABC building 1st floor east), data with the closest article detection time to the time YY is selected for each ID. Then, the information about the relative positions of the article with respect to the position RFID tag is referred to so that the display unit 14 displays the position of the article c with respect to the positions of the position RFID tag 30a at ABC building $1^{st}$ floor north and the position RFID tag 30b at ABC building $1^{st}$ floor east as a reference. In this display method, a user can locate the article c using the plurality of position RFID tags as marks. The position RFID tags 30 are displayed as follows. Specifically, the position RFID tag 30a associated with data of detection of the article c at the closest time to the time YY is illustrated as a solid double circle, and the position RFID tag 30b, which is another position RFID tag, is illustrated as a dashed double circle. With this display method, a user can preferentially refer to the position information about the article detected at the closest time to the designated time YY.

As described above, the method of managing article position information according to the first exemplary embodiment uses the position RFID tag 30 as a reference in identifying a position for use in article management. Thus, the position RFID tag 30 does not have to be stored in association with quantitative position information. Thus, a user can introduce a position information detection system 1 with ease by simply attaching the article RFID tag 40 to a management target and installing the position RFID tag 30.

When a user is to locate an article, even if quantitative coordinates indicating the position of an article are displayed on the display unit 14, it is difficult for the user to intuitively locate the article. Displaying the position of the article with respect to the position of one position RFID tag 30 or the positions of the plurality of position RFID tags 30 as a reference makes it easier for the user to locate the article.

The position RFID tag 30 does not need connection of a power source cable. Thus, the position RFID tag 30 can be installed by a simple method, e.g., placing the position RFID tag 30 on a floor or attaching the position RFID tag 30 to a wall, so that the position information detection system 1 can be introduced with ease not only for indoor use but also for outdoor use.

The position RFID tag 30 does not have to be situated at a fixed position. For example, the position RFID tag 30 can be installed in a truck bed to detect position information about an article in the moving truck bed.

As described above, the system of managing article position information according to the present exemplary embodiment can be easily introduced both inside and outside with at low cost and can manage position information about management targets to which the RFID tags are attached existing over a large area.

Second Exemplary Embodiment

FIG. 9 is a system diagram according to a second exemplary embodiment. A system according to the present exemplary embodiment is different from the first exemplary embodiment in that a server 20, instead of the RFID reader 100, processes data necessary for position detection and that the database 12 also manages the position RFID detection time in association. Each configuration similar to that in the first exemplary embodiment is given the same reference numeral, and a redundant description thereof is omitted.

In a position detection system 2 in FIG. 9, the plurality of RFID readers 100 (100a, 100b, . . . ) is connected to the server 20. Each RFID reader 100 transmits data to the server 20 in association with ID information about the RFID tags (the article RFID tag 40 and the position RFID tag 30), relative positions of the RFID tags with respect to a reference position described below, and the detection time of each of the RFID tags. A time display in FIG. 9 indicates that the detection time proceeds in the order of 10, 11, 12, 20, 21, and 31.

Figure 18:
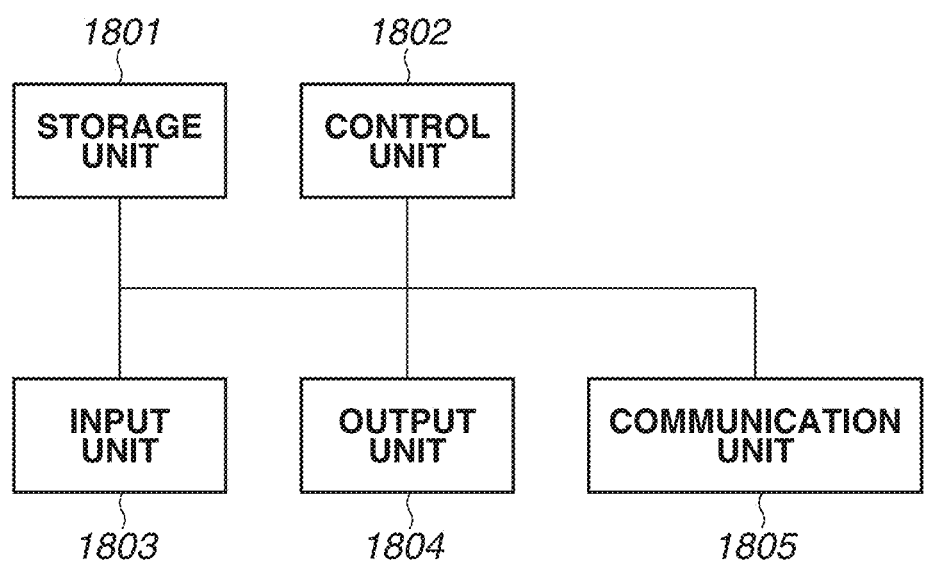
FIG. 18 is a diagram illustrating a hardware configuration of a server 20.

FIG. 18 illustrates a hardware configuration of the server 20 according to the present exemplary embodiment. A storage unit 1801 includes one or more memories, such as one or both of a ROM and a RAM, and stores programs for executing various operations described below and databases described below. Besides the memories such as the ROM and RAM, a storage medium such as a flexible disk, a hard disk, an optical disk, a magneto-optical disk, a compact disk (CD) ROM, a CD recordable (CD-R), a magnetic tape, a non-volatile memory card, or a digital versatile disk (DVD) can be used as the storage unit 1801.

A control unit 1802 includes a calculation unit 23 illustrated in FIG. 9 and includes, for example, one or more processors such as a CPU and a micro processing unit (MPU), an application-specific integrated circuit (ASIC), a digital signal processor (DSP), and a field-programmable gate array (FPGA). CPU is the abbreviation for Central Processing Unit, and MPU is the abbreviation for Micro Processing Unit. The control unit 1802 executes a program stored in the storage unit 1801 to thereby control the entire apparatus.

An input unit 1803 receives various operations from a user. An output unit 1804 outputs various types of output to a user. The output of the output unit 1804 includes at least one of a display on a screen, audio output via a speaker, and vibration output. Alternatively, the input unit 1803 and the output unit 1804 can be implemented by a single module such as a touch panel. A communication unit 1805 can perform wired or wireless communication, and the server 20 can communicate with the RFID reader using the communication unit 1805.

In the system diagram in FIG. 9, databases to be stored in the storage unit 1801 of the server 20 are illustrated. The server 20 discriminates the position RFID tag 30 from the article RFID tag 40, as described below with reference to FIG. 11. In a case where the server 20 receives data on the position RFID tag 30 from the RFID reader 100, the server 20 stores the data in a database 21a, whereas in a case where the server 20 receives data on the article RFID tag 40, the server 20 stores the data in a database 21b. The databases 21a and 21b store ID information about the RFID reader 100 to identify the RFID reader by which the data is received. The databases 21a and 21b are databases for temporary storage for use in data processing and generating of the database 12 by the server 20.

The database 11 of the server 20 stores the time of installation of the position RFID tag in addition to the position name of the position RFID tag 30. Here, data on a case where the position RFID tag 30 of the ID information 30a is installed at ABC building 1$^{st}$ floor north at time 10 and is then moved to and installed at ABC building 2nd floor at time 20 is illustrated. The position RFID tag 30 of ID information 30b indicates that the position RFID tag 30 is installed at ABC building 1$^{st}$ floor east at the time 10.

The database 12 stores the ID information about the position RFID tag 30, the ID information about the article RFID tag 40, the relative position of the article RFID tag 40 with respect to the position RFID tag 30, the detection time of the article RFID tag 40, and the detection time of the position RFID tag 30 in association.

Use of an installation time of the position RFID tag 30 in the database 11 and an installation time of the position RFID tag 30 in the database 12 makes it possible to process data as suitable for a case where the position RFID tag 30 is moved, as described below with reference to FIGS. 12A, 12B, and 12C. The RFID reader and the server 20 can communicate via a network such as the Internet or an intranet. The server 20 as an information processing apparatus can include a single apparatus or a plurality of apparatuses. Further, the server 20 can include a plurality of apparatuses cooperating via a network such as the cloud. Further, the server 20 and the information terminal 10 can be integrated.

Figure 10:
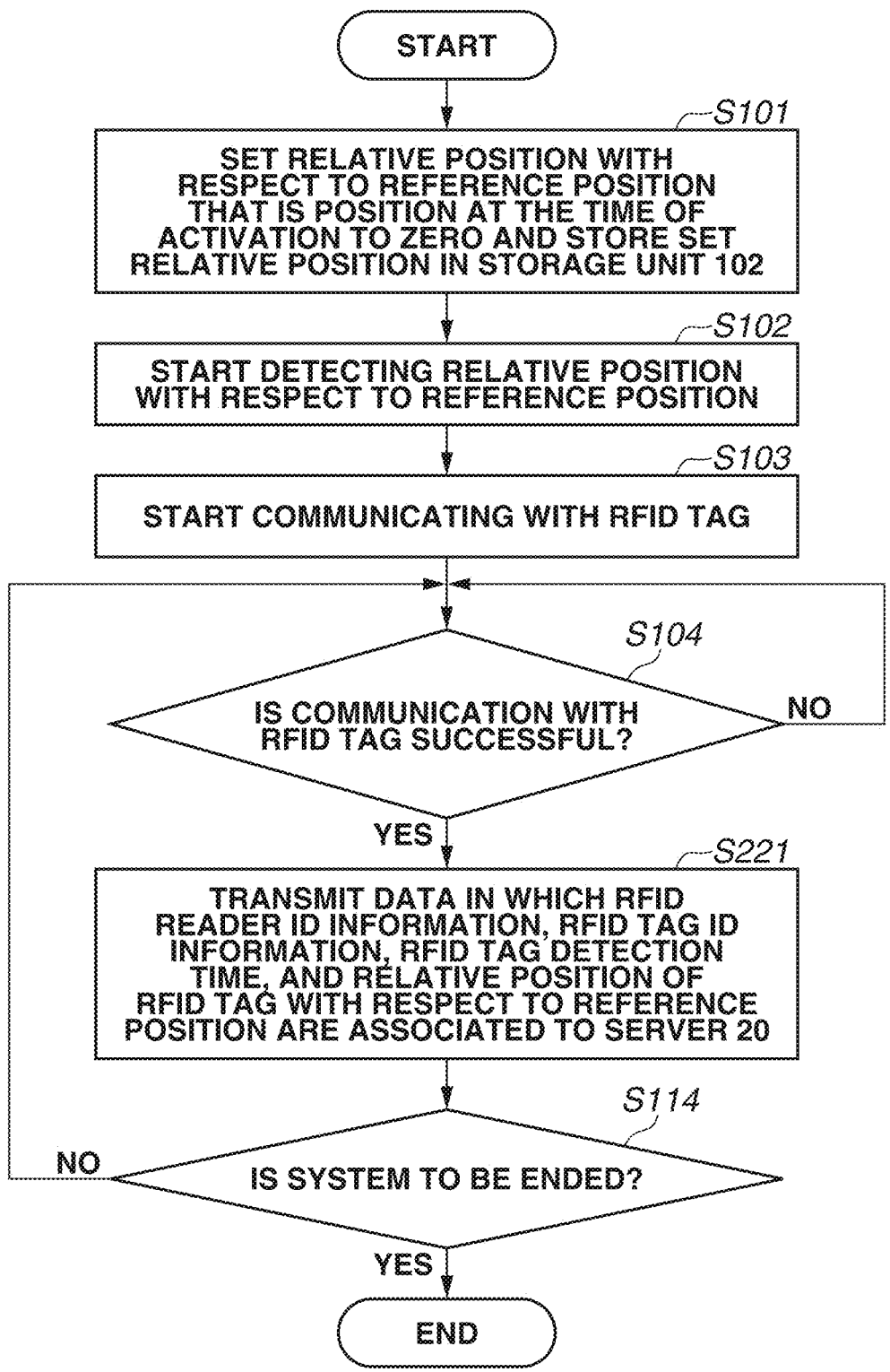
FIG. 10 is a flowchart illustrating a process of control by a RFID reader 100 according to the second exemplary embodiment.

FIG. 10 is a flowchart illustrating a process that is executed by the RFID reader 100 according to the present exemplary embodiment. The calculation unit 101 of the RFID reader 100 executes a program stored in the storage unit 102 to thereby implement the steps in the flowchart in FIG. 10.

In step S221, the RFID reader 100 transmits information associated with RFID reader ID information, RFID tag ID information, RFID tag detection time, and the relative positions of the RFID tag with respect to the reference position to the server 20.

The RFID reader 100 according to the present exemplary embodiment performs only the minimum data processing and transmits the data to the server 20, and the server 20 processes the data used for position detection. Thus, in the system 2 according to the present exemplary embodiment, the data processing to be performed by the RFID reader 100 is reduced, so that the calculation unit 101 that has low calculation capacity can be used, and the necessary data capacity for the storage unit 102 is reduced.

Figure 11:
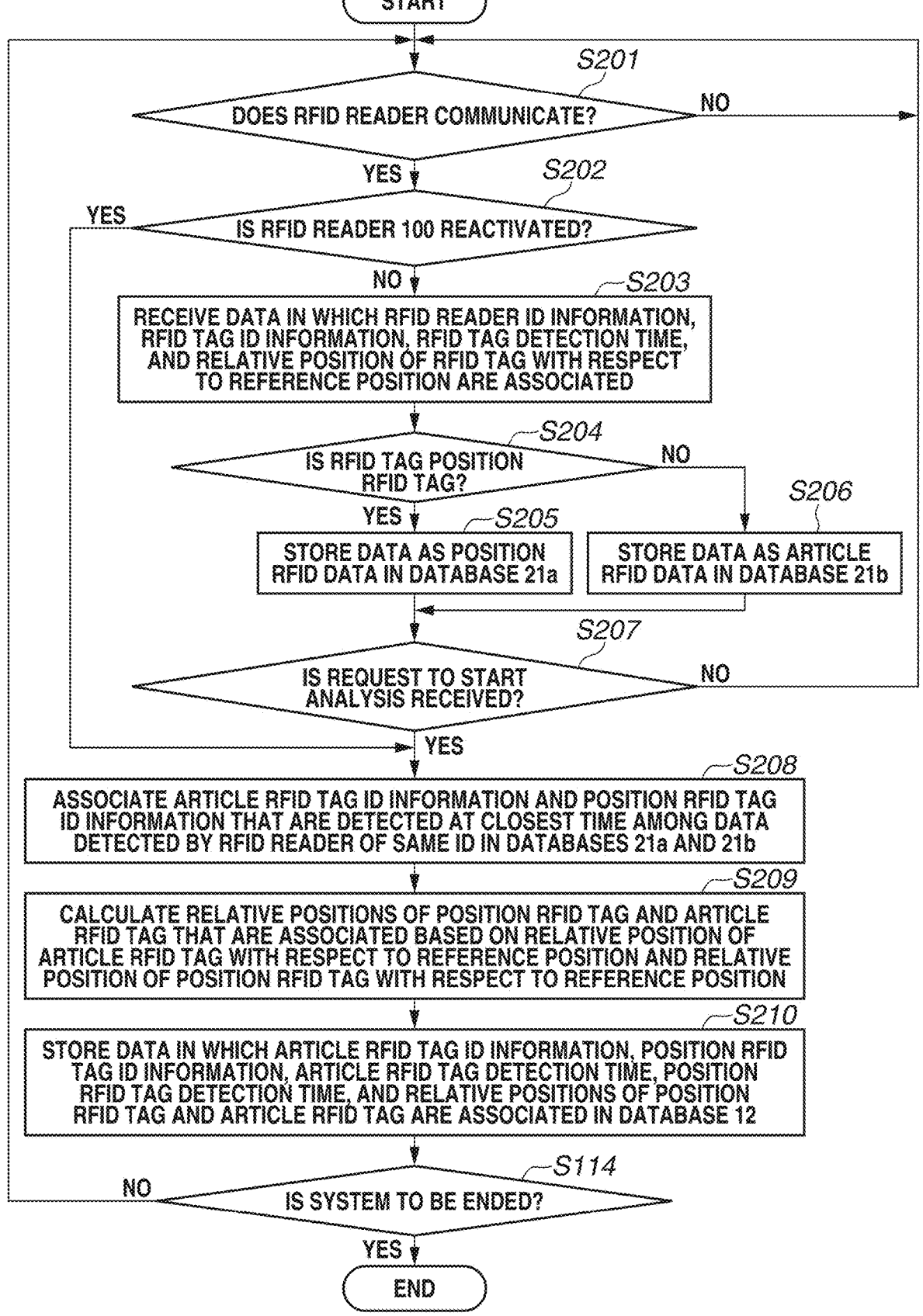
FIG. 11 is a flowchart illustrating a process of control by a server 20 according to the second exemplary embodiment.

FIG. 11 is a flowchart illustrating a process that is executed by the server 20 according to the present exemplary embodiment. The control unit 1802 of the server 20 executes a program stored in the storage unit 1801 to thereby implement the steps in the flowchart in FIG. 11.

In step S201, the server 20 waits until data is transmitted from the RFID reader 100, and the processing proceeds to step S202. In step S202, the server 20 determines whether the RFID reader 100 is reactivated by turning on and off the power source. In the case where the RFID reader 100 is reactivated, the reference position at the time of activation that is to be used as a reference is changed, so that information about the relative position in the RFID tag detection result before the reactivation and the RFID tag detection result after the reactivation can no longer be detected. Thus, in a case where the RFID reader 100 is reactivated, the processing proceeds to steps S208 to S210, and the data processing on the RFID tag detected before the reactivation is completed. Thereafter, the data in the databases that has been analyzed is erased, and the processing returns to step S201. The databases 21a and 21b erase old data that has been analyzed so that the amount of data to be stored in the server 20 is reduced.

In the present exemplary embodiment, a case where the RFID readers 100a and 100b are reactivated between time 12 and the time 20 and between time 21 and time 31 in FIG. 9 will be described below. For a purpose of description, the old data to be erased is also displayed in the databases 21a and 21b in FIG. 9.

In step S203, the server 20 receives the data in which the RFID reader ID information, the RFID tag ID information, the RFID tag detection time, and the relative position of the RFID tag with respect to the reference position are associated with one another. In step S204, the server 20 determines whether the RFID tag is the position RFID tag 30 or the article RFID tag 40 based on the RFID tag ID information. In a case where the RFID tag is the position RFID tag 30, the processing proceeds to step S205. On the other hand, in a case where the RFID tag is the article RFID tag 40, the processing proceeds to step S206.

In step S205, the server 20 stores the data received in step S203 in the database 21a as data on the position RFID tag 30. In step S206, the server 20 stores the data received in step S203 in the database 21b as data on the article RFID tag 40. In step S207, the server 20 checks whether a request to analyze the data in the databases 21a and 21b is received. The server 20 performs data analysis, for example, in a case where a predetermined number of pieces of data or more are accumulated in the databases 21a and 21b, at regular timings, or based on a user instruction.

In step S208, the server 20 associates the position RFID tag 30 and the article RFID tag 40 from the databases 21a and 21b that are detected at the closest time among the data detected by the same RFID reader 100. Thereafter, the processing proceeds to step S208.

In a method of associating the data in the databases 21a and 21b according to a modified example, the position RFID tag 30 and the article RFID tag 40 that are detected at the closest relative positions by the same RFID reader 100 are stored in association with each other. Further, in a case where the database 12 has a large storage capacity, combinations of data to associate the position RFID tag 30 and the article RFID tag 40 can be increased. For example, the article RFID tag 40 can be stored in the database 12 in association with both the position RFID tag 30 detected at the closest time and the position RFID tag 30 detected at the closest relative position.

Associated data 120 in the parentheses in the database 12 in FIG. 9 is an example of data in which the position RFID tag 30 and the article RFID tag 40 that are detected not at the closest time are associated with each other.

In step S209, the server 20 calculates the relative position of the article RFID tag 40 with respect to the position RFID tag 30 that has been associated in step S208 based on the relative position of the position RFID tag 30 with respect to the reference position and the relative position of the article RFID tag 40 with respect to the reference position.

As described above, the data transmitted from the RFID reader 100 to the server 20 is associated with the information about the relative positions of the article RFID tag 40 and the position RFID tag 30 based on a common reference position (the common reference position in the present exemplary embodiment is the initial position at the time of activation of the RFID reader 100). Thus, the relative position of the article RFID tag 40 with respect to the position RFID tag 30 can be calculated by data processing by the server 20.

The common reference position does not have to be the initial position at the time of activation of the RFID reader 100 and, for example, a position at which an RFID tag is detected for the first time after the RFID reader 100 is activated can be used as the reference position. The method illustrated in FIG. 11 is a mere example of a method of transmitting information about relative positions of a plurality of RFID tags detected by the RFID reader 100, and any other methods can be used.

The RFID reader 100 includes at least a unit that detects the RFID tag ID information and the information about a relative position of an RFID tag with respect to the reference position. The server 20 can calculate the relative position of the position RFID tag 30 with respect to the article RFID tag 40 based on the ID information and the information about the relative positions of the plurality of RFID tags that are transmitted from the RFID reader 100.

In step S210, the server 20 associates the ID information about the article RFID tag 40, the ID information about the position RFID tag 30, the detection time of the article RFID tag 40, the detection time of the position RFID tag 30, and the relative position of the article RFID tag 40 with respect to the position RFID tag 30. Then, the information is stored in the database 12.

The foregoing process is repeated until a system end request is received (S114).

FIGS. 12A, 12B, and 12C each illustrate an example of a display that is displayed on the display unit 14 of the information terminal 10 according to the present exemplary embodiment. In the display examples illustrated in FIGS. 12A, 12B, and 12C, position information about management target articles is displayed based on the information in the databases 11 and 12.

The information terminal 10 transmits information such as position name, article name, and time to the server 20 based on a user instruction via an interface (not illustrated) of the information terminal 10. The server 20 having received the information selects data necessary for the display on the display unit 14 from the database 12 and transmits the selected data to the information terminal 10. The information terminal 10 displays article position information on the display unit 14 based on the data received from the server 20.

FIG. 12A illustrates a display example in which position information about the article RFID tag 40 with respect to ABC building $1^{st}$ floor north (ID information 30a about the position RFID tag 30) at time 11 as a reference is displayed. From the database 11 in FIG. 9 it is understood that the position RFID tag 30 is installed at ABC building $1^{st}$ floor north during the period from the time 10 to the time 20. The server 20 selects data with the ID information about the position RFID tag 30 that matches 30a and with the detection time of the article RFID tag closest to the time 11 during the period from the time 10 to the time 20. The server 20 transmits the article name of the article RFID tag 40 of the selected data and the information about the relative position of the article RFID tag 40 with respect to the position RFID tag 30a in association, so that the information terminal 10 can display the article position information illustrated in FIG. 12A on the display unit 14.

Meanwhile, in data processing by the server 20, the information about the articles a and b is associated with ABC building $1^{st}$ floor north based on a detection result of the RFID reader 100a. The information about the article c is associated with ABC building 1st floor north based on a detection result of the RFID reader 100b. As described above, information detected by the plurality of RFID readers 100 is combined by the server 20 to reduce detection omissions of the article RFID tag 40.

FIG. 12B illustrates position information about the article RFID tag 40 with respect to ABC building 2nd floor (ID information 30a about the position RFID tag 30) at time 21 as a reference. From the database 11 in FIG. 9 it is understood that the position RFID tag 30 of the ID information 30a is at ABC building 2nd floor at the time 20. Thus, the display in FIG. 12B uses the position RFID tag 30 detected at the time 20 or after and the detection result of the article RFID tag 40.

As described above, in a case where the position RFID tag 30 is moved, a user only needs to register a new position name and installation time in the database 11 after the position RFID tag 30 is moved. Thus, the user can move a use site of the position detection system 2 by a simple operation.

Further, the database 12 stores the detection time of the position RFID tag 30 in addition to the detection time of the article RFID tag 40. Thus, even in a case where a user installs the position RFID tag 30 at a new position and, after a while, the user registers the name of the new position of the position RFID tag 30 and installation time thereof in the database 11, article position information of past data in the database 12 can be retrospectively displayed. In the case where the position RFID tag 30 is moved, a method in which the detection time of the position RFID tag 30 is also stored in the database 12 is effective.

FIG. 12C illustrates position information about the article RFID tag 40 with respect to ABC building 1st floor east (ID information 30b about the position RFID tag 30) at time 31 as a reference. As specified in the database 11 in FIG. 9, the position RFID tag 30 of the ID information 30b is installed at ABC building 1st floor east at the time 10. Thus, the display in FIG. 12C uses the position RFID tag 30 detected at the time 10 or after and the detection result of the article RFID tag 40 among the data on the article RFID tag 40 associated with the position RFID tag 30 of the ID information 30b.

An advantage of the control method according to the present exemplary embodiment in a case where a user A of the RFID reader 100a installs the position RFID tag 30a and a user B of the RFID reader 100b installs the position RFID tag 30b will be described below. Since the user B has installed the position RFID tag 30b at ABC building 1st floor east by the time 31, the user A can detect the position RFID tag 30b and the relative positions of the articles b and c at the time 31 with use of the RFID reader 100a. Thus, it is understood that as more users use the position detection system 2 and install the position RFID tag 30, it becomes easier to detect the position of the article RFID tag 40.

In the position detection system 2 according to a modified example, the information terminal 10 is not used, the RFID reader 100 includes the display unit 14, and the server 20 transmits data to the RFID reader 100 to display the data on the display unit 14 of the RFID reader 100. Further, instead of the RFID reader 100 and the server 20 communicating directly, the RFID reader 100 and the information terminal 10 can be connected so that the RFID reader 100 and the server 20 communicate via the information terminal 10. Further, instead of using the server 20, the information terminal 10 can perform the data processing of the server 20 according to the present exemplary embodiment.

As described above, the RFID reader 100 according to the present exemplary embodiment includes a unit that detects the ID information about the RFID tag and detects the information about the relative position of the RFID tag with respect to the reference position. The server 20 can calculate the relative position of an article RFID tag with respect to the position RFID tag based on the information transmitted from the RFID reader 100.

Third Exemplary Embodiment

Figure 13:
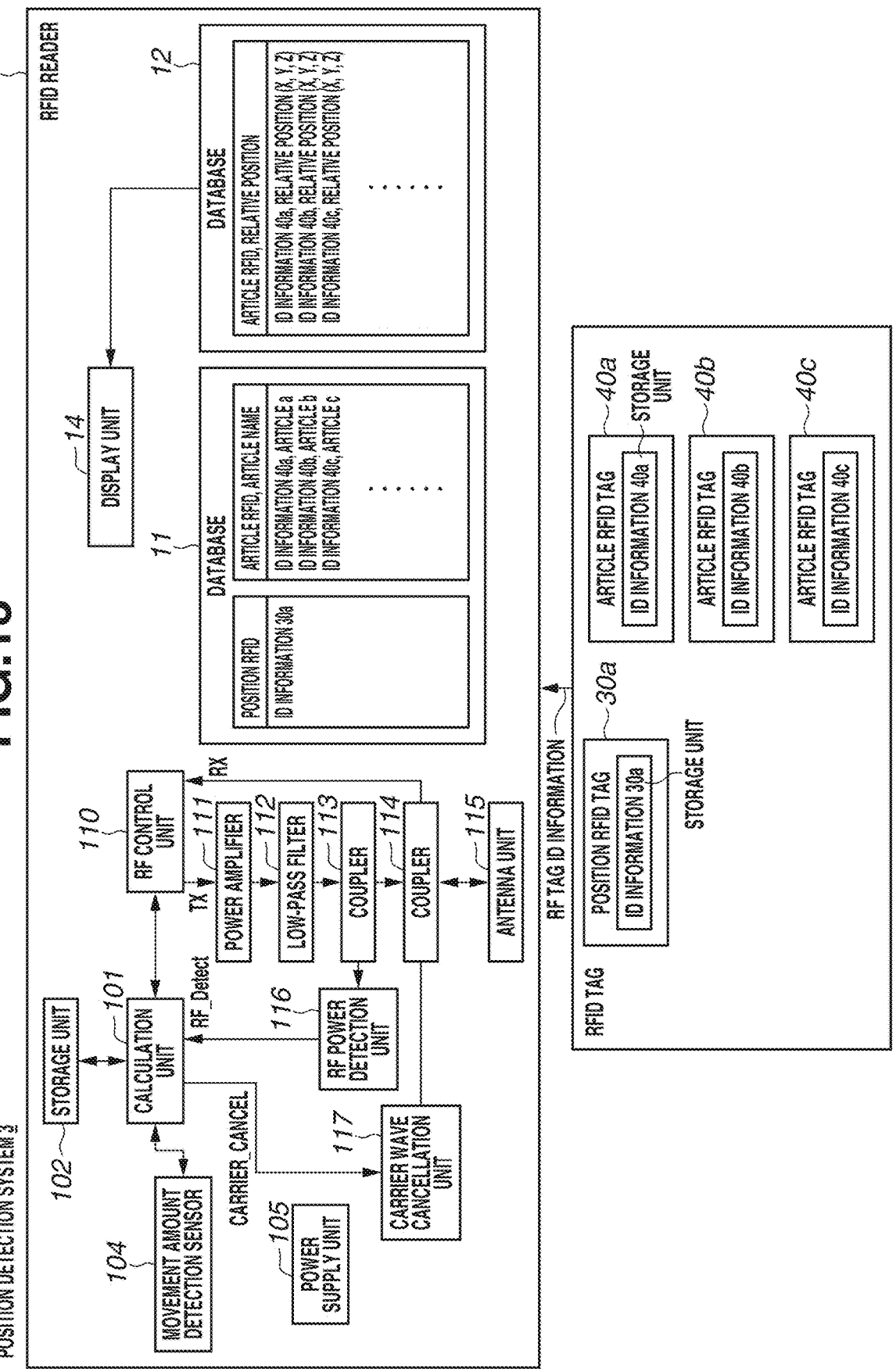
FIG. 13 is a system diagram according to a third exemplary embodiment.

FIG. 13 is a system diagram according to a third exemplary embodiment. The system according to the present exemplary embodiment uses an RFID reader 200 in which the RFID reader 100 according to the first exemplary embodiment and the information terminal 10 are integrated. The present exemplary embodiment is different from the first exemplary embodiment in that the database 12 stores the ID information about the article RFID tag 40 in association with only the information about the relative position with respect to the reference position. Each configuration similar to that in the first exemplary embodiment is given the same reference numeral, and a redundant description thereof is omitted.

The RFID reader 200 in FIG. 13 includes the functions of the display unit 14 and the databases 11 and 12 in addition to the function of the RFID reader 100 according to the first exemplary embodiment. Instead, the communication unit 103 is not included.

The position detection system 3 according to the present exemplary embodiment includes only one position RFID tag 30, and it is unnecessary to store the ID information about the position RFID tag 30 in association with the ID information about the article RFID tag 40 and the relative position information in the database 12. Further, it is also unnecessary to store the position RFID tag 30 in the database 11 in association with the position name. In order to discriminate between the position RFID tag 30 and the article RFID tag 40, only the ID information about the position RFID tag 30 is stored in the database 11.

Further, the position detection system 3 can display only the newest position information detection result on the display unit 14, and it is unnecessary to store the detection time of the article RFID tag 40 in association in the database 12. The detection result of the newest article RFID tag 40 is updated and stored for each ID.

Figure 14:
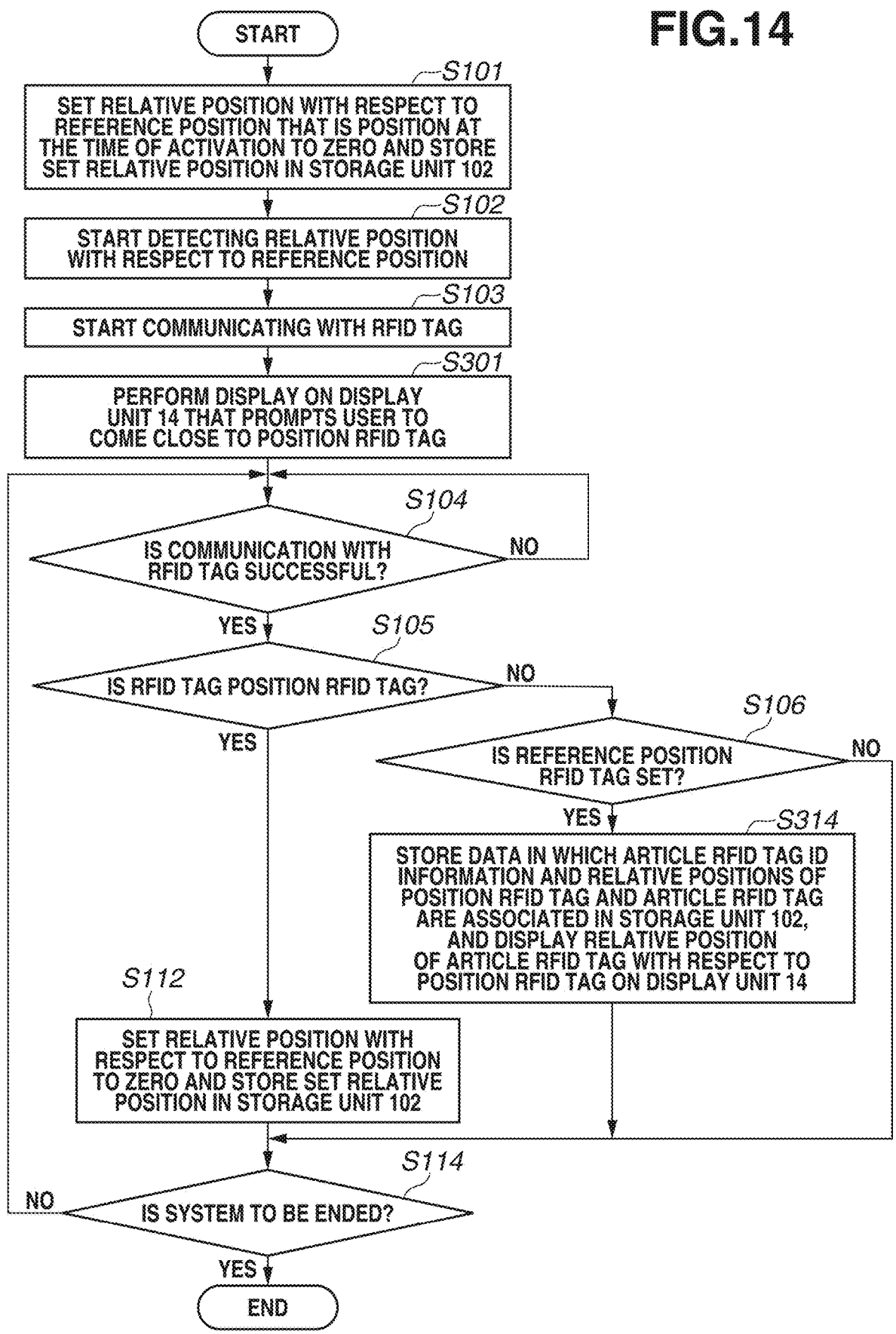
FIG. 14 is a flowchart illustrating a process of control by a RFID reader 200 according to a third exemplary embodiment.

FIG. 14 is a flowchart illustrating a process that is executed by the RFID reader 200 according to the present exemplary embodiment. The flowchart is different from the flowchart in FIG. 4 according to the first exemplary embodiment in that after a position RFID tag is detected in step S105, updating of article RFID tag data is started. Another difference is that only the ID information about the article RFID tag 40 and the information about the relative position of the article RFID tag 40 with respect to the position RFID tag 30 are stored in step S314. The calculation unit 101 of the RFID reader 200 executes the steps in the flowchart in FIG. 14 as in FIG. 4.

Under the control according to the present exemplary embodiment, the RFID reader 200 does not update the RFID tag data until the position RFID tag 30 is detected in step S105. Thus, in step S301, the display unit 14 displays a display that prompts a user to come close to the position RFID tag until the position RFID tag 30 is detected for the first time.

Further, in a case where the position RFID tag 30 is not detected for a predetermined period from the start of the control by the RFID reader 100, control is performed to prompt a user to detect the position RFID tag 30 using a display on the display unit 14 or a buzzer. This can be performed also in the cases of the first and second exemplary embodiments.

In step S314, the RFID reader 200 updates the ID information about the article RFID tag 40 and the information about the relative position of the article RFID tag 40 with respect to the position RFID tag 30a in the database 12. The display unit 14 displays the relative position of the article RFID tag with respect to the position RFID tag 30a.

The foregoing process is repeated until a system end request is received (S114).

As described above, in the position detection system 3 according to the present exemplary embodiment, the ID information about the position RFID tag 30 and the detection time of the article RFID tag 40 do not have to be stored, so that the necessary data capacity of the database 12 can be further reduced. Thus, the system is applicable even in a case where the storage unit 102 of the RFID reader 200 has a small data capacity. Further, since it is not necessary to communicate with the information terminal 10 or the server 20, the communication unit 103 is not needed, so that the cost of the RFID reader 200 can be reduced.

Only the ID information about the article RFID tag 40 and the information about the relative position of the article RFID tag 40 with respect to the position RFID tag 30 are the data to be managed in the database 12 according to the present exemplary embodiment. Even in this case, position information about management targets to which RFID tags are attached and that can be used both indoor and outdoor with ease at a low cost and are existing over a large area can be managed.

[Description of Position RFID Tag and Article RFID Tag]

FIGS. 15A and 15B are diagrams illustrating RFID tags that are examples of the position RFID tag 30 and the article RFID tag 40 that can be used in the first to third exemplary embodiments.

The position RFID tag 30 illustrated in FIG. 15A is used as a reference position in managing position information about an article to which the article RFID tag 40 is attached. A holding member 32 is an exterior package used to hold the position RFID tag 30.

As illustrated in FIG. 15B, the article RFID tag 40 is a RFID tag attached to an article.

Meanwhile, the position RFID tag 30 and the article RFID tag 40 are RFID tags that can communicate with the RF control unit 110 of the RFID reader 100 and operate based on the same principles. Thus, in the position information management methods according to the first to third exemplary embodiments, it is unnecessary to separately provide a detection circuit for article detection and a detection circuit for position detection, so that advantages such as reduced cost, reduced size, and reduced power consumption of the RFID reader 100 can be obtained.

[Method of Increasing Article Position Detection Accuracy]

FIGS. 6 and 7 are flowcharts each illustrating a process of control of a method of further increasing the accuracy of position information about the article RFID tag 40. The processes are executed as needed when the RFID reader detects the position RFID tag in the first to third exemplary embodiments. The calculation unit of the RFID reader executes a program stored in the storage unit to thereby execute the steps in the flowcharts in FIGS. 6 and 7.

The control in FIG. 6 is started if the RFID reader 100 detects the position RFID tag 30.

In step S401, the RFID reader 100 stores the detected ID information about the position RFID tag 30 in the storage unit 102. In step S402, the RFID reader 100 decreases a level of RF output (Tx signal) of the RF control unit 110 of the RFID reader 100. In step S403, the RFID reader 100 determines whether communication with the position RFID tag 30 stored in step S401 is successful again. In a case where the communication is successful, the processing proceeds to step S402, and the RF output of the RFID reader is further reduced, and the processing is repeated until the communication is no longer successful in step S403. On the other hand, in a case where the communication is not successful, the processing proceeds to step S404.

In step S404, the RFID reader 100 stores the lowest RF output at which the communication with the position RFID tag 30 is successful in association with the ID information about the position RFID tag 30. In step S405, the RFID reader 100 determines whether the RF output is the lowest RF output value in a predetermined period in a history of successful communication with the position RFID tag 30 of the same ID information. In step S405, in a case where the RF output is the lowest RF output value, the processing proceeds to step S108. In step S108, the ID information about the position RFID tag 30 that is detected is stored in the storage unit 102, and the processing proceeds to step S112. In step S112, the relative position is set to zero. On the other hand, in step S405, in a case where the RF output is not the lowest RF output value, the position RFID tag detection result is voided, and the relative position is not set to zero.

In the control flowchart in FIG. 6, in a case where the RFID reader 100 successfully detects the position RFID tag 30 at low RF output, it is determined that the position RFID tag 30 and the RFID reader 100 are near each other. Then, at this timing, the relative position is set to zero so that data upon successful detection of the position RFID tag 30 at the low RF output is associated with the detected data on the article RFID tag 40.

Similarly, the control in FIG. 7 is started if the RFID reader 100 detects the position RFID tag 30.

In step S504, the RFID reader 100 stores the intensity of the RF input (Rx signal) received by the RF control unit 110 of the RFID reader 100 in the storage unit 102. In step S505, the RFID reader 100 determines whether the RF input is the highest RF input value in a predetermined period in a history of successful communication with the position RFID tag 30 of the same ID information. In step S505, in a case where the RF input is the highest RF input value, the processing proceeds to step S108. In step S108, the ID information about the position RFID tag 30 that is detected is stored in the storage unit 102, and the processing proceeds to step S112. In step S112, the relative position is set to zero. On the other hand, in step S505, in a case where the RF input is not the highest RF input value, the position RFID tag detection results are voided, and the relative position is not set to zero.

In the control flowchart in FIG. 7, in a case where the RFID reader 100 successfully detects the position RFID tag 30 at high RF input, it is determined that the position RFID tag 30 and the RFID reader 100 are near each other. Then, at this timing, the relative position is reset so that data on successful detection of the position RFID tag 30 at the high RF input is associated with the detected data on the article RFID tag 40.

In the article position management system according to each of the exemplary embodiments of the present invention, the position RFID tag 30 is used as the reference position. Thus, performing the control methods illustrated in FIGS. 6 and 7 particularly on the position RFID tag 30 increases accuracy of position information to be managed.

Further, performing control similar to those in FIGS. 6 and 7 on the article RFID tag 40 can increase the accuracy of position information to be managed.

In a case where the server 20 performs data processing as in the second exemplary embodiment, data on the intensity of the RF input or the intensity of RF output of the RFID reader 100 is stored in association with the databases 21a and 21b of the server 20. This enables the server 20 to perform control similar to those in FIGS. 6 and 7. The methods of increasing the accuracy of position information that are illustrated in FIGS. 6 and 7 are also applicable to the cases of the second exemplary embodiment.

Figure 8:
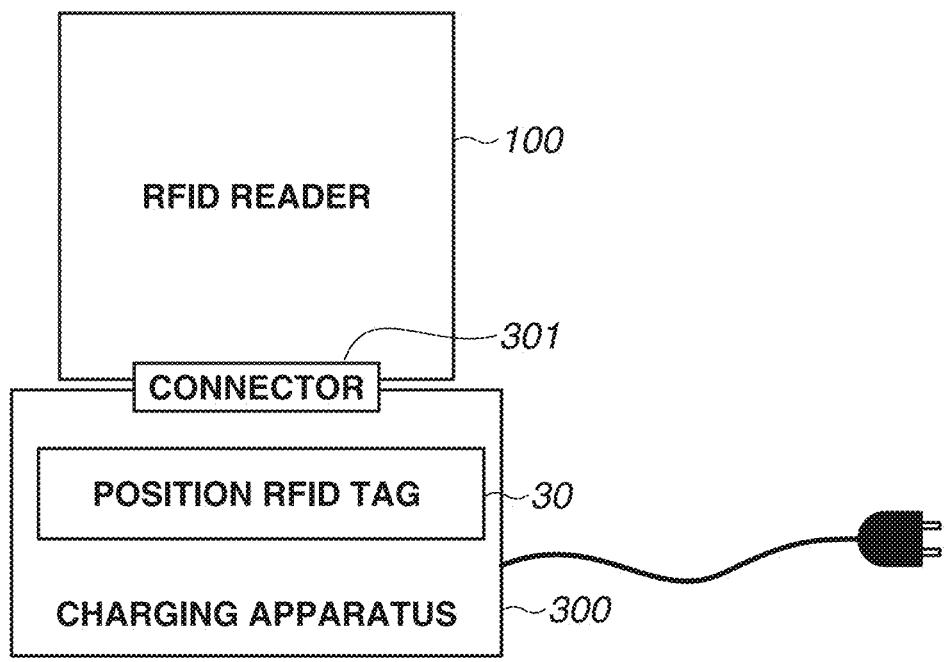
FIG. 8 is diagram illustrating a charging apparatus 300 of the RFID reader 100.

FIG. 8 illustrates a method of using a charging apparatus 300 of the RFID reader 100 as the position RFID tag 30 by including the function of the position RFID tag 30 in the charging apparatus 300. A connector 301 is used to connect the charging apparatus 300 with the RFID reader 100.

Use of the charging apparatus 300 makes it possible to detect the position RFID tag 30 in short range at the time of charging the RFID reader 100. In particular, by combining with the control in FIGS. 6 and 7, the accuracy of position information about the RFID reader 100 is increased.

[Control of Radiation Directivity of Antenna]

FIGS. 16A, 16B, 16C, and 16D illustrate the antenna unit 115 with a radiation directivity control function that can be used in the first to third exemplary embodiments. Substrates 1101 and 1102 are overlaid along a Z-axis, which is a thickness direction of the substrates 1101 and 1102, in this order in a −Z direction.

Figure 16A:
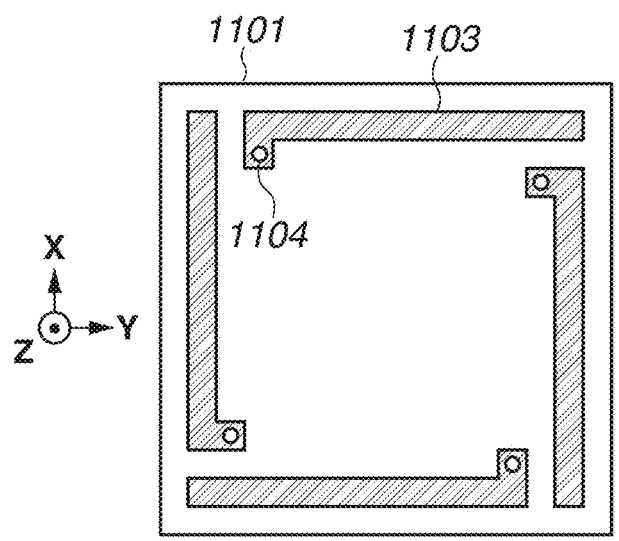
FIG. 16A is a diagram illustrating a configuration of an antenna 115.

FIG. 16A illustrates a front surface of the substrate 1101. Four antenna elements 1103 are arranged in such a manner that extension directions of the antenna elements 1103 are each changed by 90 degrees along X- and Y-axes so that open ends do not overlap, and a power-feed end, which is an end portion on the opposite side of the open end, is connected to a via 1104. The extension directions of the open ends can be the opposite directions, or an element shape can be a meander line shape.

Figure 16B:
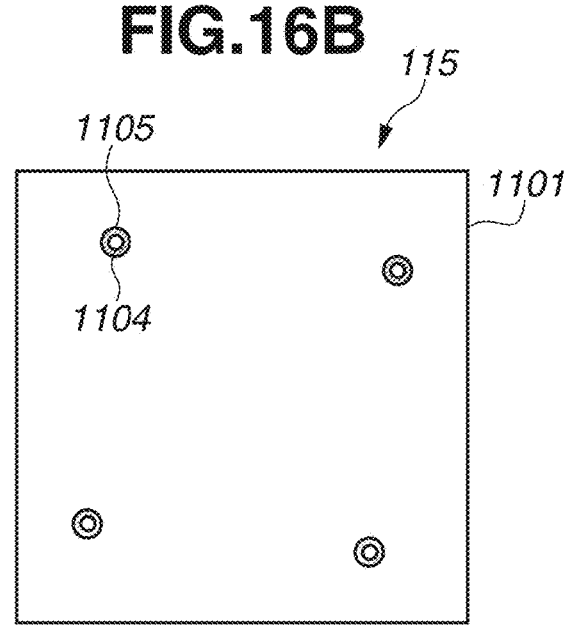
FIG. 16B is a diagram illustrating the configuration of the antenna 115.

FIG. 16B illustrates a back surface of the substrate 1101. Four vias 1104 are through the substrate 1101 and are connected to four pads 1105.

Figure 16C:
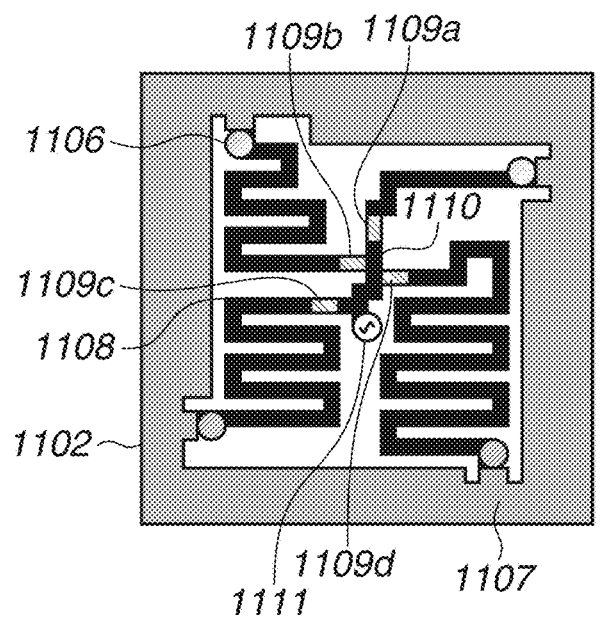
FIG. 16C is a diagram illustrating the configuration of the antenna 115.

FIG. 16C illustrates a front surface of the substrate 1102. Four pads 1106 are connected to a ground 1107 and respectively to four RF lines 1108. The pads 1105 and 1106 are each in surface contact with a metallic spacer that is a conductive portion (not illustrated) to become conductive.

The four RF lines 1108 pass through respective four RF switches 1109 (1109a to 1109d) and a shared RF line 1110, and are connected to a transmission/reception unit 1111 (coupler 114).

One end of each of the RF switches 1109 is connected to each of the RF lines 1108, and another end thereof is connected to the RF line 1110, and the RF switch 1109 controls whether to short-circuit or open. Thus, in a case where the RF switch 1109 is in a short-circuited state, RF signals can pass through between the transmission/reception unit 1111 and the antenna element 1103, whereas in a case where the RF switch 1109 is in an open state, RF signals cannot pass through between the transmission/reception unit 1111 and the antenna element 1103.

Figure 16D:
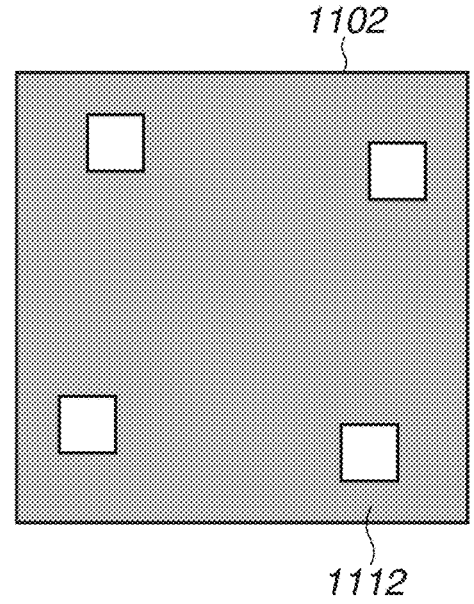
FIG. 16D is a diagram illustrating the configuration of the antenna 115.

FIG. 16D illustrates a back surface of the substrate 1102. A ground 1112 is disposed over an entire surface except for regions that overlap the pads 1106 and is electrically connected to the ground 1107 through a plurality of vias (not illustrated) through the substrate 1102. The line width and thickness of the RF lines 1108 and 1110 are determined based on a layer structure and permittivity of the substrate 1102 to obtain about 50 ohm at RF signal frequencies.

The four pads 1106 are respectively defined as A, B, C, and D in this order in a counterclockwise direction from the top right in the drawing, and total electric lengths of the RF lines connecting A, B, C, D and the transmission/reception unit 1111 are respectively denoted by a, b, c, and d. At this time, the four RF lines 1108 are arranged in a meander line shape to satisfy the relationships b=a+λ/4, c=b+λ/4, and d=c+λ/4 and to not overlap the ground 1107. The four RF lines 1108 are each to have a phase difference of λ/4, i.e., about 90 degrees, and rotation directions and implementation methods to provide the phase differences can be any directions and methods, and a phase shifter can be used instead of line lengths.

The RF signals that are transmitted and received by the antenna unit 115 are circularly polarized waves in a case where the RF signals are combined waves of the four antenna elements 1103, whereas the RF signals are linearly polarized waves in a case where the RF signals are combined waves of a combination of the two facing antenna elements 1103.

FIGS. 17A, 17B, and 17C illustrate radiation characteristics of an antenna that resonates at 920 MHz in the present exemplary embodiment. At this time, the substrates 1101 and 1102 each have a substrate thickness of 1 mm and a relative permittivity of 4.3, and a distance between the substrates 1101 and 1102 is 7 mm, and an element length of an inverted-F antenna is about λ/4. Further, the RF lines each have a line width of 1.6 mm and a line thickness of 35 um.

FIG. 17A illustrates radiation characteristics in a case where all of the RF switches 1109a to 1109d are short-circuited, and RF signals of circularly polarized waves with the main directivity in a +Z direction are emitted.

FIG. 17B illustrates radiation characteristics in a case where the RF switches 1109a and 1109c are short-circuited and the RF switches 1109b and 1109d are opened, and RF signals of linearly polarized waves are emitted in +X and −X directions.

FIG. 17C illustrates radiation characteristics in a case where the RF switches 1109b and 1109d are short-circuited and the RF switches 1109a and 1109c are opened, and RF signals of linearly polarized waves are emitted in +Y and −Y directions.

With the techniques described above, RFID tags that are situated in X-axis and Y-axis directions and cannot be read by RF signals of circularly polarized waves emitted in the +Z direction alone become readable by changing the directivity. Furthermore, position information about articles to which the RFID tags are attached existing over a large area become detectable. The RFID reader 100 detects the RFID tags while changing the radiation characteristics of the antenna unit 115 in a plurality of directions, and the antenna unit 115 is suitable for use in the first to third exemplary embodiments.

Other Embodiments

The first to third exemplary embodiments described above can be implemented in combination as needed. For example, the RFID reader including the display unit according to the third exemplary embodiment does not necessarily have to display position information about management target articles on the display unit of the RFID reader and can transmit the information to a server or an information terminal. Alternatively, whether to display the information on the RFID reader or to transmit the information to the server or the information terminal can be selected by a user operation.

The present invention is not to be limited to the above described exemplary embodiments and can be altered or modified in various ways without departing from the spirit and the scope of the present invention. Therefore, the following claims are appended to make the scope of the present invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a power supply;
a detection unit configured to detect a wireless device;
a storage unit configured to store identification information about the wireless device;
a calculation unit configured to calculate a first relative position of a second wireless device with respect to a first wireless device to be a reference in identifying a position based on a movement amount of the communication apparatus, the second wireless device being a device different from the first wireless device; and
an association unit configured to associate the first relative position, identification information about the second wireless device, and identification information about the first wireless device,
wherein, when a position of the communication apparatus at a time of activation of the power supply of the communication apparatus is defined as an initial position, in a case where the second wireless device is detected in a state in which the first wireless device is not detected after detection of the initial position by the detection unit,
the storage unit stores a second relative position of the second wireless device with respect to the initial position, and, in a case where the first wireless device is detected after detection of the second wireless device by the detection unit, stores a third relative position of the first wireless device with respect to the initial position, and
based on the second relative position and the third relative position, the calculation unit calculates the first relative position.

2. The communication apparatus according to claim 1, further comprising:
a determination unit configured to determine whether the wireless device detected by the detection unit is the first wireless device,
wherein the storage unit stores the identification information about the detected wireless device as the identification information about the first wireless device in a case where the determination unit determines that the detected wireless device is the first wireless device.

3. The communication apparatus according to claim 1, wherein the association unit further associates information indicating time of detection of the wireless device.

4. The communication apparatus according to claim 1, further comprising a transmission unit configured to transmit the information associated by the association unit to an information terminal.

5. The communication apparatus according to claim 1, further comprising a display unit configured to display position information about the second wireless device based on the calculated first relative position.

6. The communication apparatus according to claim 1, wherein the communication apparatus is a radio frequency identification (RFID) reader, the wireless device is an RFID tag, and the detection unit detects the wireless device using RFID.

7. The communication apparatus according to claim 1, wherein the detection unit detects the wireless device using an antenna configured to change radiation directivity of an electric wave.

8. A non-transitory computer-readable storage medium storing a program that causes a computer to operate as the communication apparatus according to claim 1.

9. An information processing apparatus comprising:
a reception unit configured to receive, from a communication apparatus that detects a wireless device, identification information about a detected first wireless device and information about a first relative position of the first wireless device with respect to an initial position;
a calculation unit configured to calculate a third relative position of a second wireless device with respect to the first wireless device, based on the information received by the reception unit, using information about a second relative position of the second wireless device to be a reference in identifying a position with respect to the initial position, the second wireless device being a device different from the first wireless device, and the information about the first relative position of the detected first wireless device; and
an association unit configured to associate the third relative position calculated by the calculation unit, the identification information about the first wireless device, and identification information about the second wireless device, wherein, when a position of the communication apparatus at a time of activation of a power supply of the communication apparatus is defined as the initial position, in a case where the first wireless device is detected in a state in which the second wireless device is not detected after detection of the initial position, based on the first relative position, and based on a second relative position of the second wireless device with respect to the initial position in a case where the second wireless device is detected after detection of the first wireless device, the calculation unit calculates the third relative position.

10. The information processing apparatus according to claim 9, wherein the reception unit receives information indicating time of the detection of the wireless device by the communication apparatus, and wherein the calculation unit selects a wireless device to be a target of calculation of the third relative position, based on first time at which the first wireless device is detected and second time at which the second wireless device is detected.

11. The information processing apparatus according to claim 9, further comprising a transmission unit configured to transmit information about the third relative position calculated by the calculation unit to an information terminal.

12. The information processing apparatus according to claim 9, further comprising a display unit configured to display position information about the wireless device that is indicated by the identification information received by the reception unit, based on the third relative position calculated by the calculation unit.

13. The information processing apparatus according to claim 9, wherein the wireless device is an RFID tag, the communication apparatus that detects the wireless device is an RFID reader, and the reception unit receives information about the wireless device detected by the communication apparatus using RFID.

14. A non-transitory computer-readable storage medium storing a program that causes a computer to operate as the information processing apparatus according to claim 9.

15. A position information management method comprising:

detecting a wireless device by a communication apparatus;

calculating a first relative position of a second wireless device different from a first wireless device with respect to the first wireless device to be a reference in identifying a position, based on;

i) a movement amount of the communication apparatus detected by the detecting, wherein, when a position of the communication apparatus at a time of activation of the power supply of the communication apparatus is defined as an initial position, in a case where the first wireless device is detected in a state in which the second wireless device is not detected after detection of the initial position, ii) a third relative position of the first wireless device with respect to the initial position, and iii) a second relative position of the second wireless device with respect to the initial position in a case where the second wireless device is detected after detection of the first wireless device; and associating the first relative position calculated by the calculating, identification information about the second wireless device, and identification information about the first wireless device.

16. A position information management method comprising:

receiving, from a communication apparatus that detects a wireless device, identification information about a detected first wireless device and information about a first relative position of the first wireless device with respect to an initial position;

calculating, when a position of the communication apparatus at a time of activation of the power supply of the communication apparatus is defined as an initial position, in a case where the first wireless device is detected in a state in which a second wireless device to be a reference in identifying a position is not detected after detection of the initial position, the second wireless device being a device different from the first wireless device, a third relative position of the first wireless device with respect to the second wireless device, using the information about the first relative position received by the receiving and information about the second relative position of the second wireless device with respect to the initial position; and associating the third relative position calculated by the calculating, the identification information about the second wireless device, and identification information about the first wireless device.

* * * * *